United States Patent
Taylor

(10) Patent No.: US 11,016,493 B2
(45) Date of Patent: May 25, 2021

(54) PLANNING ROBOT STOPPING POINTS TO AVOID COLLISIONS

(71) Applicant: X Development LLC, Mountain View, CA (US)

(72) Inventor: Kevin Taylor, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 89 days.

(21) Appl. No.: 16/588,689

(22) Filed: Sep. 30, 2019

(65) Prior Publication Data

US 2020/0026301 A1 Jan. 23, 2020

Related U.S. Application Data

(63) Continuation of application No. 15/851,998, filed on Dec. 22, 2017, now Pat. No. 10,466,707.

(51) Int. Cl.
*G05D 1/02* (2020.01)
*G05D 1/00* (2006.01)
*B62D 1/00* (2006.01)

(52) U.S. Cl.
CPC ......... *G05D 1/0214* (2013.01); *G05D 1/0088* (2013.01); *G05D 1/0223* (2013.01); *G05D 2201/0216* (2013.01); *Y10S 901/01* (2013.01)

(58) Field of Classification Search
CPC .. G05D 1/0214; G05D 1/0223; G05D 1/0088; G05D 2201/0216; G05D 1/00;
(Continued)

(56) References Cited

U.S. PATENT DOCUMENTS 5,640,323 A * 6/1997 Kleimenhagen ..... G05D 1/0272
701/1
5,648,901 A * 7/1997 Gudat .................. G05D 1/0297
701/23

(Continued)

OTHER PUBLICATIONS

Bostelman et al., "Obstacle Detection and Avoidance from an Automated Guided Vehicle," 2014 IEEE/RSJ International Conference on Intelligent Robots and Systems (IROS), Sep. 18, 2014.

(Continued)

*Primary Examiner* — Yonel Beaulieu
(74) *Attorney, Agent, or Firm* — McDonnell Boehnen Hulbert & Berghoff LLP

(57) ABSTRACT

An example method includes determining a path to be followed by a vehicle through an environment. The path includes an ordered sequence of positions. The method also includes determining an intersection between a first object in the environment and a first area planned to be occupied by the vehicle while moving along the path and, in response, sequentially testing the ordered sequence of positions to identify a first ordinal position in the ordered sequence of positions, where the first ordinal position corresponds to a second area planned to be occupied by the vehicle while moving along the path, and where the second area is within a threshold distance of the first object. The method additionally includes trimming the path to remove (i) the first ordinal position and (ii) any positions subsequent thereto and causing the vehicle to stop at an end of the trimmed path.

20 Claims, 18 Drawing Sheets

(58) Field of Classification Search
CPC ......... G05D 1/02; Y10S 901/01; G01S 15/42; G01S 17/42; B62D 1/00
See application file for complete search history.

(56) References Cited

U.S. PATENT DOCUMENTS

| | | | |
|---|---|---|---|
| 5,680,306 A | 10/1997 | Shin et al. | |
| 5,680,313 A * | 10/1997 | Whittaker | G05D 1/024 701/300 |
| 5,838,562 A | 11/1998 | Gudat et al. | |
| 5,956,250 A * | 9/1999 | Gudat | G05D 1/0272 701/26 |
| 8,965,561 B2 * | 2/2015 | Jacobus | G05D 1/0274 700/216 |
| 9,201,426 B1 | 12/2015 | Bonawitz | |
| 9,645,577 B1 * | 5/2017 | Frazzoli | B60W 30/18163 |
| 9,701,239 B2 * | 7/2017 | Kentley | B60L 50/66 |
| 10,409,284 B2 * | 9/2019 | Kentley-Klay | B60W 30/09 |
| 2005/0021195 A1 * | 1/2005 | Zeitler | G05D 1/024 701/23 |
| 2012/0179322 A1 * | 7/2012 | Hennessy | G05D 1/0278 701/25 |
| 2017/0277195 A1 * | 9/2017 | Frazzoli | G05D 1/0088 |

OTHER PUBLICATIONS

Young et al., "LIDAR and monocular based overhanging obstacle detection," Procedia Computer Science 60(2015) 1423-1432.
Dubey et al., "DROAN—Disparity-space Representation for Obstacle AvoidaNce," Aug. 2017.

* cited by examiner

PLANNING ROBOT STOPPING POINTS TO AVOID COLLISIONS

CROSS REFERENCE TO RELATED APPLICATION

The present application claims priority to U.S. patent application Ser. No. 15/851,998 filed on Dec. 22, 2017, issued as U.S. Pat. No. 10,466,707, and entitled "Planning Robot Stopping Points to Avoid Collisions," which is herein incorporated by reference as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, which are flat transport structures that contain stacks of boxes or other objects thereon. Additionally, the warehouse may use machines or vehicles for lifting and moving goods or pallets of goods, such as cranes, forklifts, and pallet jacks. Human operators may be employed to operate machines, vehicles, and other equipment. In some cases, one or more of the machines or vehicles may be robotic devices guided by computer control systems.

SUMMARY

In an example embodiment, a path may be determined for a vehicle to carry out a task in an environment. The path, which includes an ordered sequence of positions, may be evaluated for potential collisions between the vehicle and objects within the environment by determining a plurality of vehicle footprints representing areas within the environment expected or planned to be occupied by the vehicle while moving along the path. A buffer region may be placed around any objects within the environment that intersect with one or more of the vehicle footprints. The buffer regions may be used to determine a first ordinal position along the path that corresponds to a vehicle footprint intersecting with one or more buffer regions. The path may then be trimmed to remove, from the ordered sequence of positions, the first ordinal position and any positions subsequent thereto, thereby removing positions predicted to result in a collision. The vehicle may follow the trimmed path and stop at an end thereof. Alternative paths following the trimmed path may be determined to navigate the vehicle around the obstacles.

In a first embodiment, a method is provided that includes determining, by a control system, a path to be followed by a vehicle through an environment. The path includes an ordered sequence of positions. The method also includes determining, by the control system, an intersection between a first object in the environment and a first area planned to be occupied by the vehicle while moving along the path and, in response, sequentially testing, by the control system, the ordered sequence of positions to identify a first ordinal position in the ordered sequence of positions, where the first ordinal position corresponds to a second area planned to be occupied by the vehicle while moving along the path, where the second area is within a threshold distance of the first object, and where all areas planned to be occupied by the vehicle at positions of the ordered sequence of positions preceding the first ordinal position are beyond the threshold distance of the first object. The method additionally includes trimming, by the control system, the path to remove, from the ordered sequence of positions, (i) the first ordinal position and (ii) any positions subsequent thereto. The method further includes causing, by the control system, the vehicle to stop at an end of the trimmed path.

In a second embodiment, a system is provided that includes a vehicle and a control system. The control system is configured to determine a path to be followed by the vehicle through an environment. The path comprises an ordered sequence of positions. The control system is also configured to determine an intersection between a first object in the environment and a first area planned to be occupied by the vehicle while moving along the path and, in response, sequentially test the ordered sequence of positions to identify a first ordinal position in the ordered sequence of positions, where the first ordinal position corresponds to a second area planned to be occupied by the vehicle while moving along the path, where the second area is within a threshold distance of the first object, and where all areas planned to be occupied by the vehicle at positions of the ordered sequence of positions preceding the first ordinal position are beyond the threshold distance of the first object. The control system is additionally configured to trim the path to remove, from the ordered sequence of positions, (i) the first ordinal position and (ii) any positions subsequent thereto. The control system is further configured to cause the vehicle to stop at an end of the trimmed path.

In a third embodiment, a non-transitory computer readable storage medium is provided having stored thereon instructions that, when executed by a computing device, cause the computing device to perform operations. The operations include determining a path to be followed by a vehicle through an environment. The path comprises an ordered sequence of positions. The operations also include determining an intersection between a first object in the environment and a first area planned to be occupied by the vehicle while moving along the path and, in response, sequentially testing the ordered sequence of positions to identify a first ordinal position in the ordered sequence of positions, where the first ordinal position corresponds to a second area planned to be occupied by the vehicle while moving along the path, where the second area is within a threshold distance of the first object, and where all areas planned to be occupied by the vehicle at positions of the ordered sequence of positions preceding the first ordinal position are beyond the threshold distance of the first object. The operations additionally include trimming the path to remove, from the ordered sequence of positions, (i) the first ordinal position and (ii) any positions subsequent thereto. The operations further include causing the vehicle to stop at an end of the trimmed path.

In a fourth embodiment, a system is provided that includes means for determining a path to be followed by a vehicle through an environment. The path comprises an ordered sequence of positions. The system also includes means for determining an intersection between a first object in the environment and a first area planned to be occupied by the vehicle while moving along the path and, in response, sequentially testing the ordered sequence of positions to identify a first ordinal position in the ordered sequence of positions, where the first ordinal position corresponds to a second area planned to be occupied by the vehicle while moving along the path, where the second area is within a threshold distance of the first object, and where all areas planned to be occupied by the vehicle at positions of the ordered sequence of positions preceding the first ordinal position are beyond the threshold distance of the first object. The system additionally includes means for trimming the path to remove, from the ordered sequence of positions, (i) the first ordinal position and (ii) any positions subsequent thereto. The system further includes means for causing the vehicle to stop at an end of the trimmed path.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
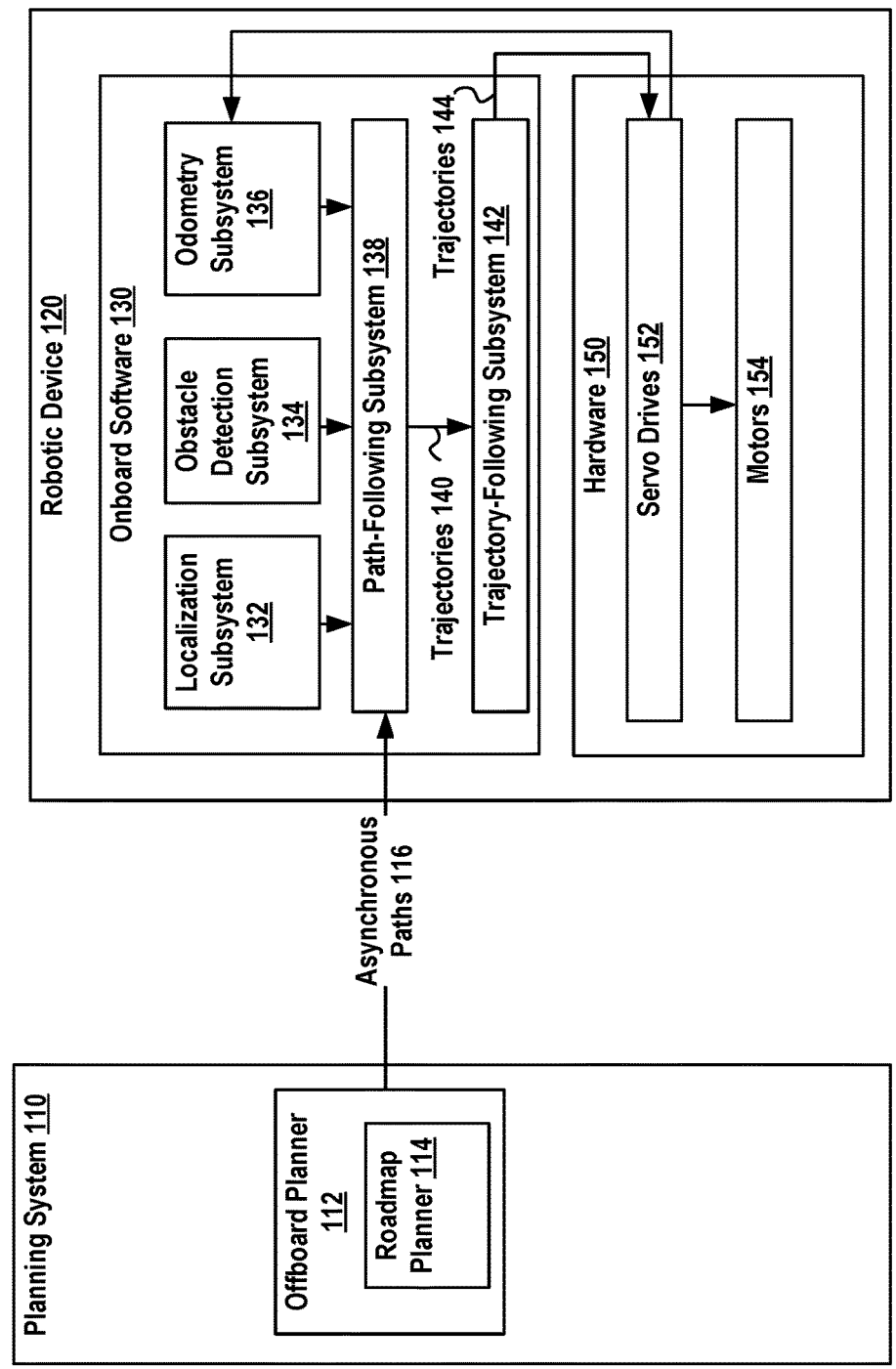
FIG. 1 illustrates a block diagram of a system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Robotic navigation in an environment such as a warehouse can allow autonomous robotic devices the ability to carry out one or more actions without the need for constant human control. When a robotic device is given a task, a corresponding path through the environment and trajectory for traversing the path may be determined for the task. The path may include an ordered sequence of locations or positions for the robotic device within the environment. The trajectory may include timing, speed, and orientation of the robotic device for each of the positions along the path.

In example embodiments, the robotic device may be a vehicle such as a pallet jack or fork truck. Paths for the vehicle may be planned with knowledge of fixed objects (e.g., pallet racks, walls) in the environment. Therefore, the planned paths may generally not intersect with such known fixed objects. Similarly, movements of multiple autonomous vehicles within the environment may be coordinated by a centralized path planner. Thus, the planned paths and trajectories of the autonomous vehicle may generally avoid collisions with other autonomous vehicles. The known fixed objects and other vehicles may be very unlikely to protrude into the planned paths for the vehicle in a manner that would be difficult to detect with sensors on the vehicle.

Nevertheless, movable and mobile objects may sometimes end up in the planned paths of the autonomous vehicle. Particularly, in a collaborative system where both autonomous and human-operated vehicles work in a shared environment, the human-operated vehicles may sometimes intersect with or be in the planned path of the autonomous vehicle. Additionally, such unexpected movable or mobile obstacles may sometimes have physical parts or portions protruding therefrom. Such protruding parts may, in some instances, be difficult to detect. For example, the tines of a human-operated vehicle may be located very close to the ground, and may therefore be below a field of view of sensors on the autonomous vehicle or may be difficult to distinguish from the ground surface of the environment. These difficult-to-detect protruding physical parts could extend into the planned path of the autonomous vehicle and potentially cause collisions.

Accordingly, before and/or while the vehicle traverses the path, the path may be evaluated for collisions between the vehicle and objects within the environment. A map of the environment may be determined based on data from sensors on the vehicle, sensors on other vehicles, and/or sensors within the environment, and may indicate objects within the environment. The map may be used to determine any intersections between objects within the environment and areas planned to be occupied by the vehicle while moving along the path.

To determine whether any of the objects constitute obstacles along the path, a plurality of vehicle footprints representing areas within the environment expected to be occupied by the vehicle may be projected along the path. These vehicle footprints may be used as a filter to identify which of the objects indicated by the map are potential obstacles. Specifically, intersections between the vehicle footprints and the objects may be determined to identify expected collisions. Objects that intersect with at least one vehicle footprint may be considered potential obstacles, while objects that do not intersect with any vehicle footprint might not constitute obstacles. An intersection between an object and a vehicle footprint may be used as a proxy signal indicative of an obstacle likely to have unexpected and difficult-to-detect protruding physical parts that should be avoided.

A buffer region may be placed around each of the objects identified as an obstacle. The buffer region may operate to enforce a minimum distance (i.e., a first threshold distance) away from the obstacle at which the vehicle is to stop to avoid colliding with the obstacle. The minimum distance may be based on a size of the obstacle, a type or classification of the obstacle, a speed of the vehicle, a size of the vehicle, a load carried by the vehicle, and/or a task assigned to the vehicle, among other factors.

Notably, placing buffers around every obstacle in the environment would result in a lot of false-positive detections of potential collisions, thus make navigation inefficient or impossible. Applying buffer regions to objects after, rather than before, identifying them as obstacles allows the number of false-positive collision detections to be reduced while allowing obstacles appearing in the vehicle's planned path to be used as a proxy for obstacles likely to have difficult-to-detect or unexpected protrusions that should be avoided or navigated around. A similar benefit may be derived from applying the buffer regions to the objects after identifying them as potential obstacles, rather than by applying a buffer region around the projected vehicle footprints before determining intersections between objects and the footprints.

The buffer region may be used to identify a first ordinal position along the path whose corresponding vehicle footprint intersects with a buffer region of at least one of the obstacles. Positions subsequent to the first ordinal position along the path may be associated with vehicle footprints that intersect with obstacles or with the buffers around the obstacles, and may thus be at risk of collision On the other hand, positions before the first ordinal position along the path may be associated with vehicle footprints that do not intersect with obstacles or with the buffers around the obstacles. That is, the buffer region may be used to identify the first position along the path likely to result in a collision. Accordingly, to avoid collisions, the path may be trimmed to remove, from the ordered sequence of positions, the first ordinal position and any positions subsequent thereto.

The vehicle may be caused to follow the trimmed path and stop at an end thereof, thus avoiding collisions with obstacles within the environment, including obstacles that may have difficult-to-detect parts protruding into the vehicle's path. A trajectory may be determined for the trimmed path to cause the vehicle to slow down and stop at the end of the trimmed path.

In some embodiments, in addition to determining vehicle footprints to indicate areas within the environment planned to be occupied by the vehicle within a future time period, object footprints may be determined for each of the mobile objects within the environment. The object footprints may be based on expected paths of the mobile objects through the environment, and may indicate areas within the environment expected to be occupied by the objects within the future time period. Intersections may then be determined between the vehicle footprints and the mobile object footprints to identify potential collisions. The intersections may be determined in space (i.e., a vehicle footprint intersects with an object footprint, regardless of timing), or in both space and time (i.e., a vehicle footprint intersects with an object footprint, and both footprints represent vehicle/object positions at the same future point in time). Buffer regions may then be applied to any objects or object footprints that are determined to intersect with at least one vehicle footprint.

II. Example System Design

FIG. 1 is a block diagram of system 100, in accordance with example embodiments. System 100 includes planning system 110 and robotic device 120. Planning system 110 can include offboard planner 112 that can coordinate motion of one or more robotic devices operating in an environment. Offboard planner 112 can include roadmap planner 114. Offboard planner 112 and/or roadmap planner 114 can generate one or more asynchronous paths 116 for a robotic device, such as robotic device 120, to follow while operating in an environment.

A roadmap graph, prototype graph, or other roadmap representing an environment can be received, determined, or otherwise provided to planning system 110, offboard planner 112 and/or roadmap planner 114. Asynchronous paths 116 can be one or more paths based on the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

Robotic device(s) 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. Localization subsystem 132 can be used to localize a robotic device, that is, determine a location of the robotic device within an environment. Localization subsystem 132 can generate position estimates of the robotic device and/or other objects that can be used to localize the robotic device, assist the robotic device in following a path, such as asynchronous paths 116, and/or assist the robotic device in following a trajectory, such as trajectories 140. Once the position estimates are generated, localization subsystem 132 can provide the position estimates to path-following subsystem 138.

An asynchronous path, or path for short, can be a time-invariant plan or other information indicating how robotic device 120 can travel from a starting point SP to an ending point EP; i.e., an (asynchronous) path does not take time into account. In contrast, a trajectory can include values of a steering angle and of traction motor velocity that robotic device 120 can follow for a planning time interval.

The planning time interval can be a duration of time that a robotic device is guided, or planned to follow a path, route, and/or travel. In some embodiments, the planning time can be a predetermined amount of time; e.g., five seconds, one second, 0.2 seconds, or 0.1 seconds. For example, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point SP to an ending point EP in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servo drives. Servo drives 152 can include an electronic amplifier used to power one or more servomechanisms and/or can monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) powered by servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
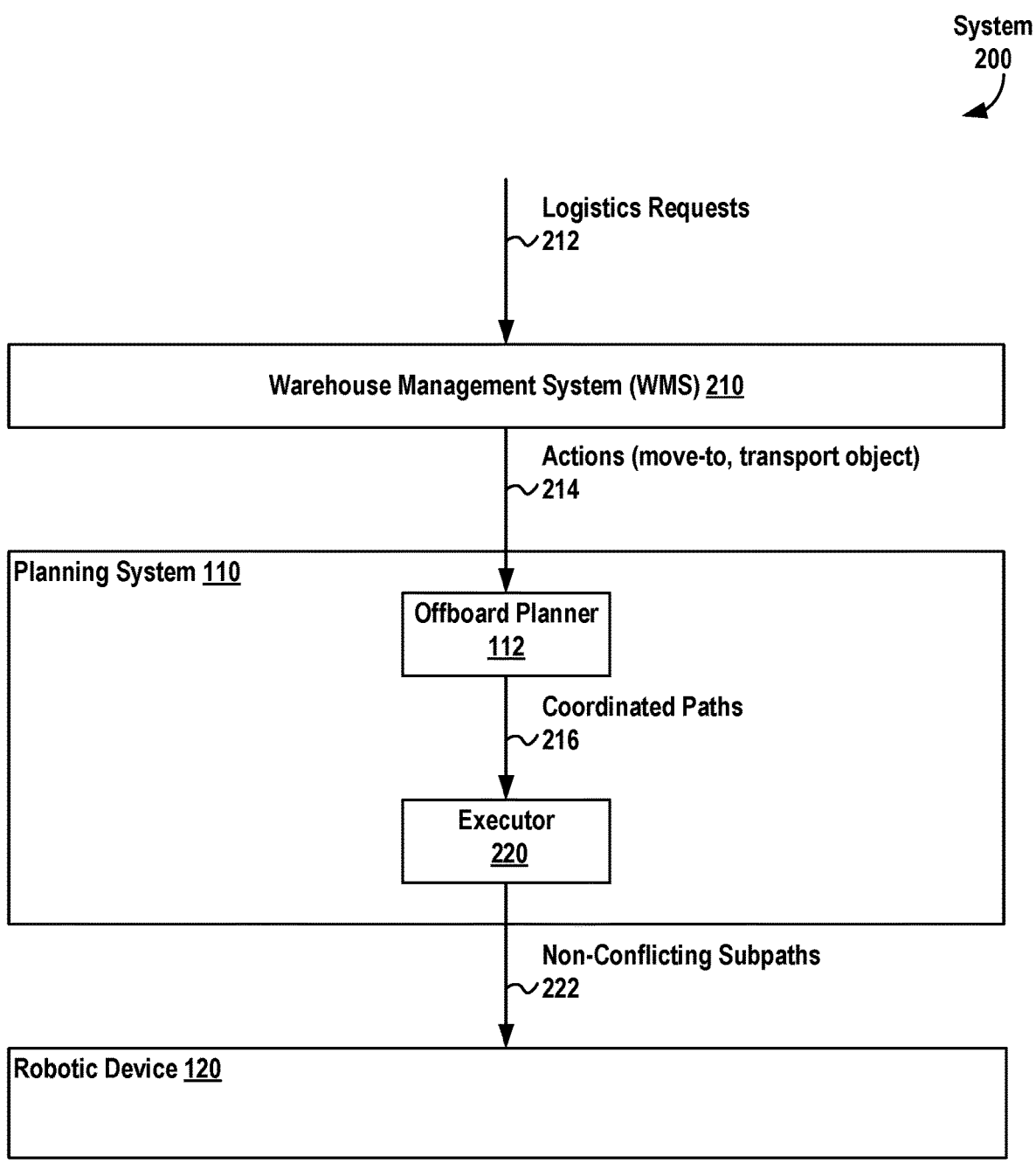
FIG. 2 illustrates a block diagram of a system for operating one or more warehouses, in accordance with example embodiments.

FIG. 2 depicts system 200 for operating one or more warehouses, in accordance with example embodiments. System 200 includes warehouse management system 210, planning system 110, and robotic device 120. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can be go-to commands of the form {agent ID, destination}, but other actions are possible such as move pallet. These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck, such as any OSHA class 1 or class 3 powered industrial truck. In other embodiments, planning system 110 can include software that executes using one or more networked computing devices located in the "cloud" (e.g., one or more networked computing devices) and/or located somewhere on a premises co-located with robotic device 120.

In some embodiments, offboard planner 112 and executor 220 can be synchronized. In an example embodiment, offboard planner 112 and executor 220 can be implemented on one device; e.g., in planning system 110 or robotic device 120, and synchronized within the device. In another example embodiment, offboard planner 112 and executor 220 can act synchronously in one or more devices.

Figure 3:
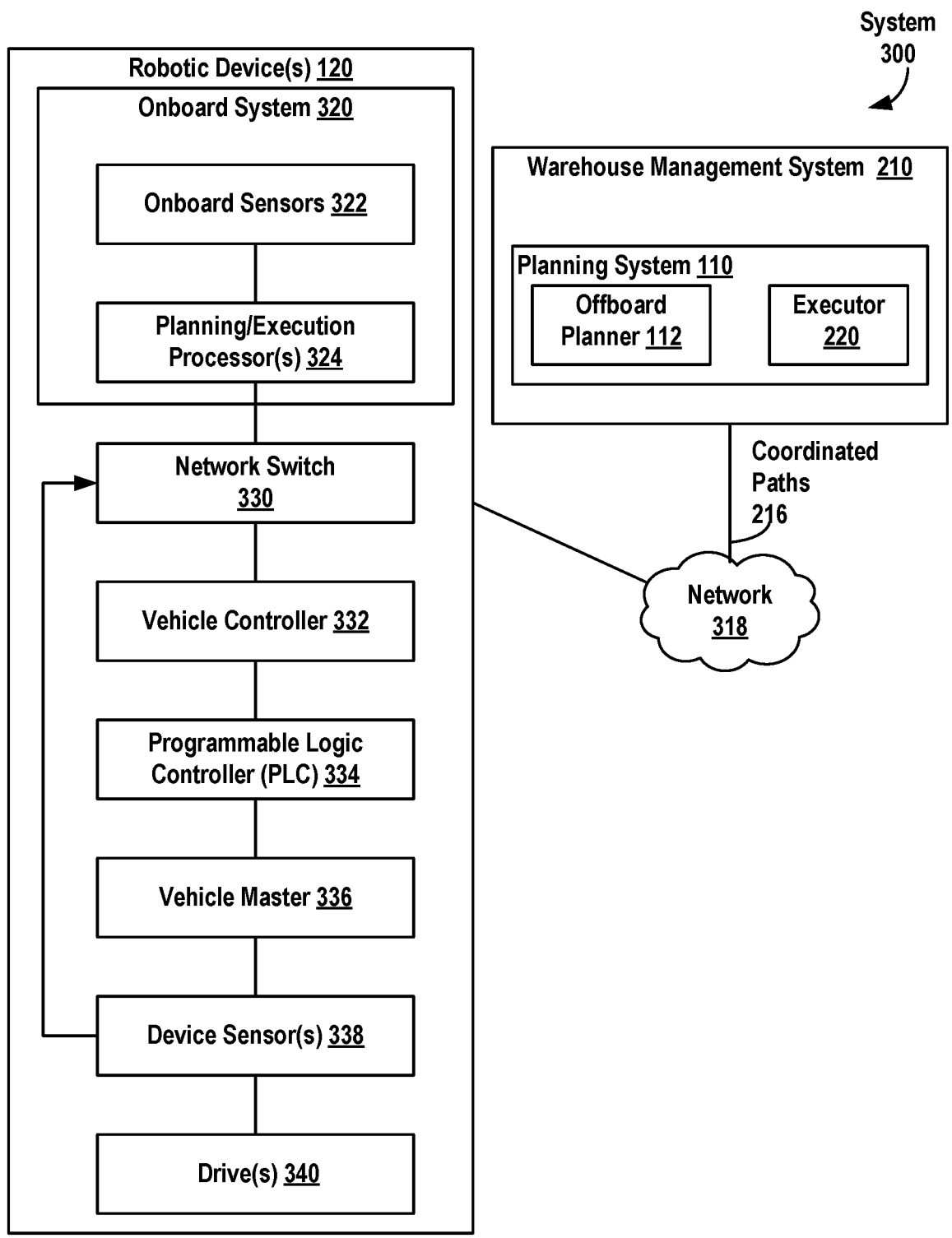
FIG. 3 illustrates a block diagram of a system, in accordance with example embodiments.

FIG. 3 illustrates a system 300 that includes warehouse management system 210, and one or more robotic devices 120 connected using network 318, in accordance with example embodiments. Inventory task instructions may be provided to warehouse management system 210 via network 318 regarding movement of objects, such as pallets, and/or robotic devices to warehouse management system 210. An example inventory task can be to bring pallet A containing items of type B to location C.

Warehouse management system 210 can receive the inventory task instructions and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1, 2, and 7-11.

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g., presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110 and/or warehouse management system 210).

In some embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/execution processors 324. FIG. 3 also shows that onboard system 320 is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners, such as one or more laser scanners provided by SICK AG of Waldkirch, Germany, HOKUYO AUTOMATIC CO. LTD of Osaka, Japan, or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost::signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The pose can be determined relative to one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g., device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 120.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
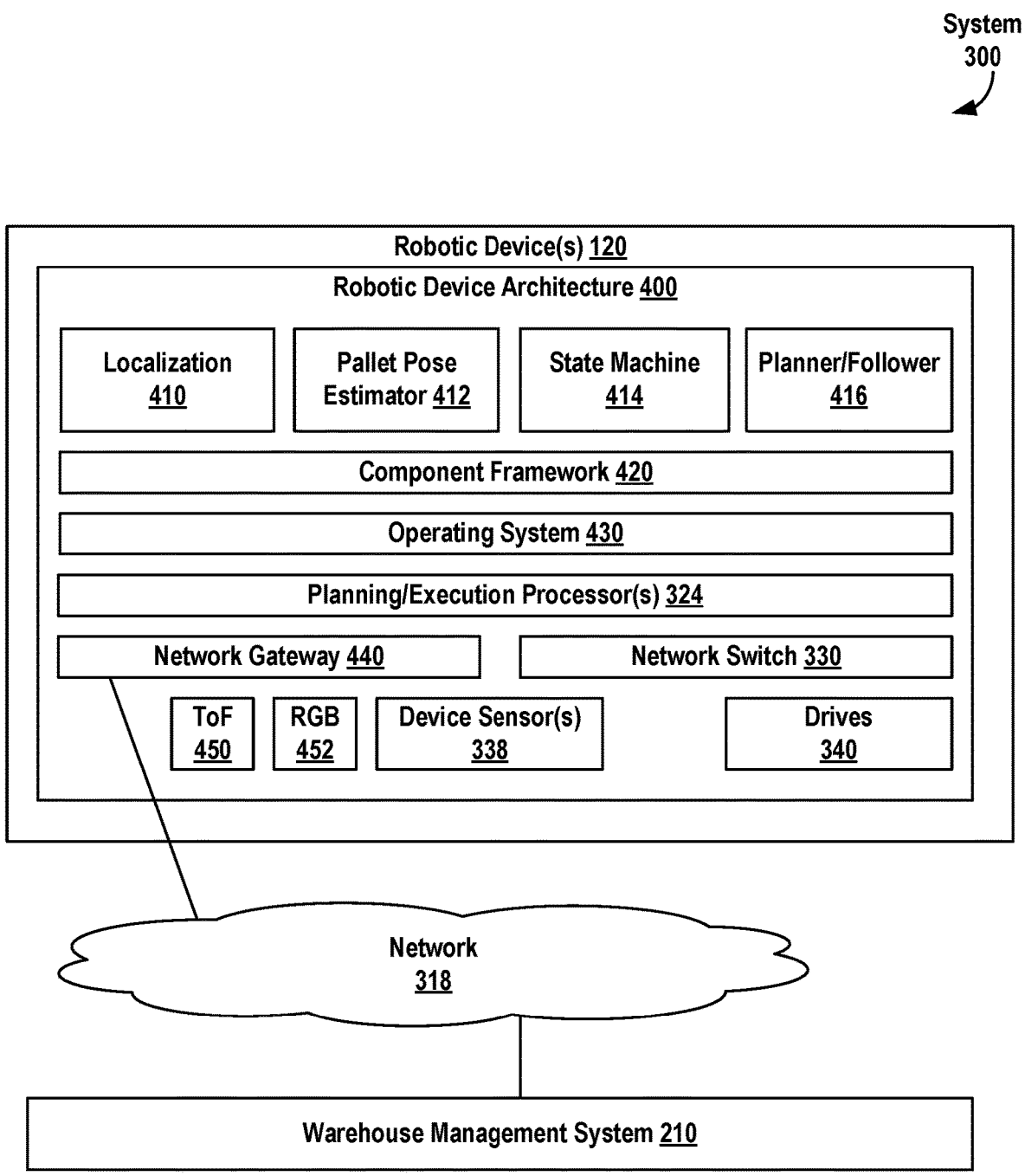
FIG. 4 illustrates a robotic device architecture for one or more robotic devices, in accordance with example embodiments.

FIG. 4 illustrates robotic device architecture 400 of robotic device(s) 120, in accordance with example embodiments. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras.

Figure 5:
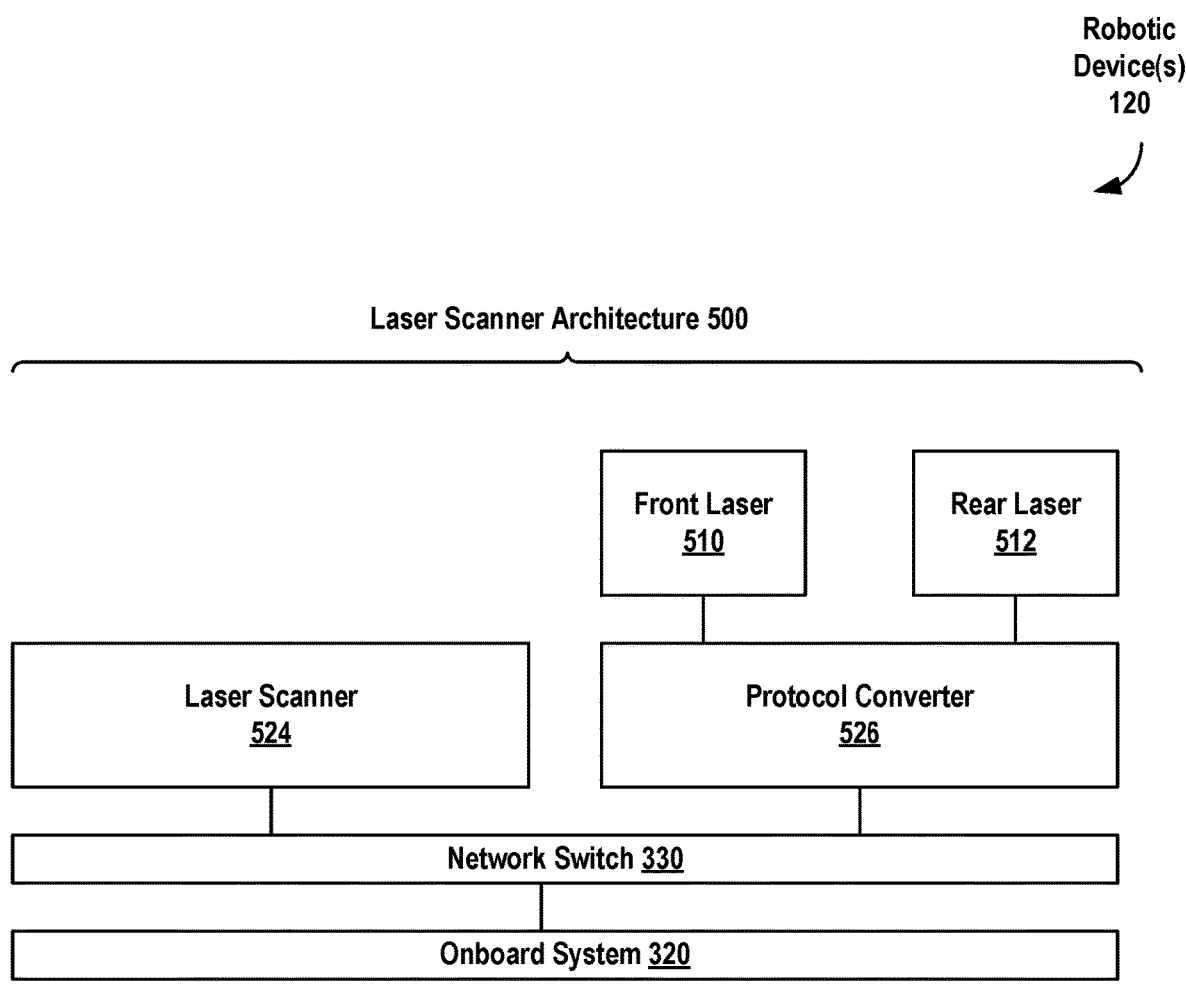
FIG. 5 illustrates a laser scanner architecture for one or more robotic devices, in accordance with example embodiments.

FIG. 5 illustrates laser scanner architecture 500 for robotic device(s) 120, in accordance with example embodiments. In some embodiments, some or all of device sensor(s) 338 can be lasers and laser scanners illustrated by laser scanner architecture 500.

Laser scanner architecture 500 can include lasers 510 and 512, laser scanner 524, protocol converter 526, network switch 330, and onboard system 320. Lasers 510 and 512 can be located at fixed positions of robotic device(s) 120; for example, laser 510 can be located at the front of a robotic device and laser 512 can be located at the rear of the robotic device. In some embodiments, additional lasers can be located at, for example, the sides and/or corners of the robotic device. Lasers 510 and 512 and/or laser scanner 524 can provide information to localize the robotic device within an environment. In some embodiments, lasers 510 and 512 and/or laser scanner 524 can emit light that is reflected off of one or more reflectors—the reflected light can be detected by one or more laser sensors, and the robotic device can be localized within the environment based on a duration of time taken to detect the reflected light. In example embodiments, some or all of lasers 510 and 512 and/or laser scanner 524 can include one or more laser sensors for detecting reflected laser light. Then, some or all of lasers 510 and 512 and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, laser scanner 524 can be directly connected to network switch 330, while lasers 510 and 512 can be connected to network switch 330 via protocol converter 526. However, in some embodiments, laser scanner 524 can be connected to network switch 330 via protocol converter 526, and lasers 510 and 512 can be connected directly to network switch 330, among other possible combinations. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510 and 512 and laser scanner 524 can send data to and receive commands from onboard system 320 via network switch 330 and perhaps protocol converter 526.

In some embodiments, robotic device(s) 120 can be subject to one or more failure conditions. Examples of those failure conditions and related recovery strategies are described in Table 2 below.

TABLE 1

| Name | Summary | Recovery Strategy |
|---|---|---|
| State Localization | Localization system is unable to determine robotic device pose and/or localization certainty estimate has exceeded bounds. | Robotic device will halt and notify human operator. The operator can intervene by manually driving robotic device to a location for re-localization and reengaging. |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |
| No Safe Trajectory | Due to obstacle proximity, the trajectory planner cannot find a safe trajectory that would keep the robotic device a safe | Robotic device will halt and notify human operator. The operator can intervene by manually driving robotic |

TABLE 1-continued

| Name | Summary | Recovery Strategy |
| --- | --- | --- |
| | distance from known obstacles. | device around obstacle. |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify human operator and send pallet pose information manually. |

III. Example Computing Device Architecture

Figure 6A:
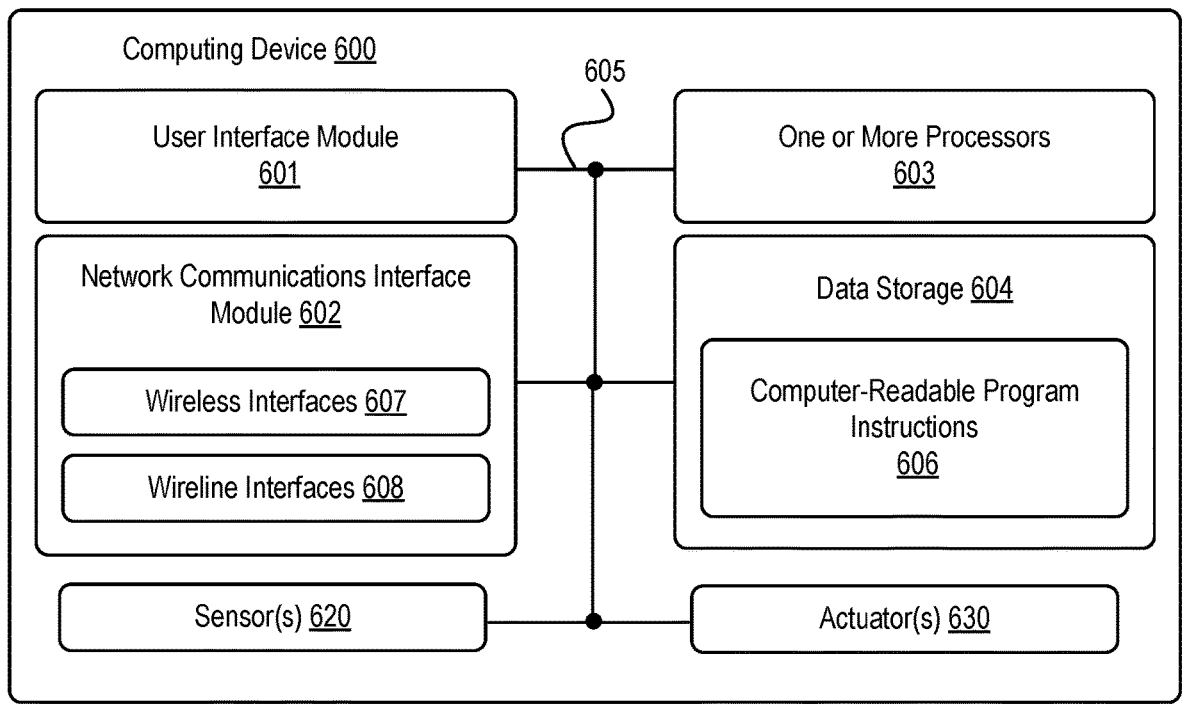
FIG. 6A illustrates a block diagram of an example computing device, in accordance with example embodiments.

FIG. 6A is a functional block diagram of computing device 600 (e.g., system, in accordance with example embodiments. Computing device 600 shown in FIG. 6A can be configured to perform at least one function related to one or more of: planning system 110, offboard planner 112, roadmap planner 114, robotic device 120, onboard software 130, hardware 150, system 200, warehouse management system 210, executor 220, network 318, onboard system 320, onboard sensors 322, planning/execution processors 324, network switch 330, central vehicle controller 332, programmable logic controller 334, vehicle master 336, device sensors 338, drives 340, robotic device architecture 400, laser scanner architecture 500, and any other methods or operations herein described. Computing device 600 may include a user interface module 601, a network-communication interface module 602, one or more processors 603, data storage 604, one or more sensors 620, and one or more actuators 630, all of which may be linked together via a system bus, network, or other connection mechanism 605. In some embodiments, computing device 600 can be configured to act as part or all of a warehouse control system.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a trackball, a joystick, a camera, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices.

Network-communications interface module 602 can include one or more wireless interfaces 607 and/or one or more wireline interfaces 608 that are configurable to communicate via a network. Wireless interfaces 607 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Processors 603 can include one or more general purpose processors, and/or one or more special purpose processors (e.g., digital signal processors, graphics processing units, application specific integrated circuits, etc.). Processors 603 can be configured to execute computer-readable program instructions 606 that are contained in the data storage 604 and/or other instructions as described herein.

Data storage 604 can include one or more computer-readable storage media that can be read and/or accessed by at least one of processors 603. The one or more computer-readable storage media can include volatile and/or non-volatile storage components, such as optical, magnetic, organic or other memory or disc storage, which can be integrated in whole or in part with at least one of processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606 and perhaps additional data. In some embodiments, data storage 604 can additionally include storage required to perform at least part of the herein-described methods and techniques and/or at least part of the functionality of the devices and networks.

In some embodiments, computing device 600 can include one or more sensors 620. Sensor(s) 620 can be configured to measure conditions in an environment for computing device 600 and provide data about that environment. For example, sensor(s) 620 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 600, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 600, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about the computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 620 are possible as well.

Computing device 600 can include one or more actuators 630 that enable computing device 600 to initiate movement. For example, actuator(s) 630 can include or be incorporated with robotic joints connecting robotic limbs to a robotic body. For example, actuator(s) 630 can include respective robotic hip and robotic shoulder joints connecting respective robotic legs and arms to the robotic body. Further, the actuator(s) 630 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 630 can include respective robotic ankle joints connecting the robotic legs to robotic feet and respective robotic wrist joints connecting the robotic arms to robotic hands. In addition, actuator(s) 630 can include motors for moving the robotic limbs. As such, the actuator(s) 630 can enable mobility of computing device 600. Many other examples of actuator(s) 630 are possible as well.

Figure 6B:
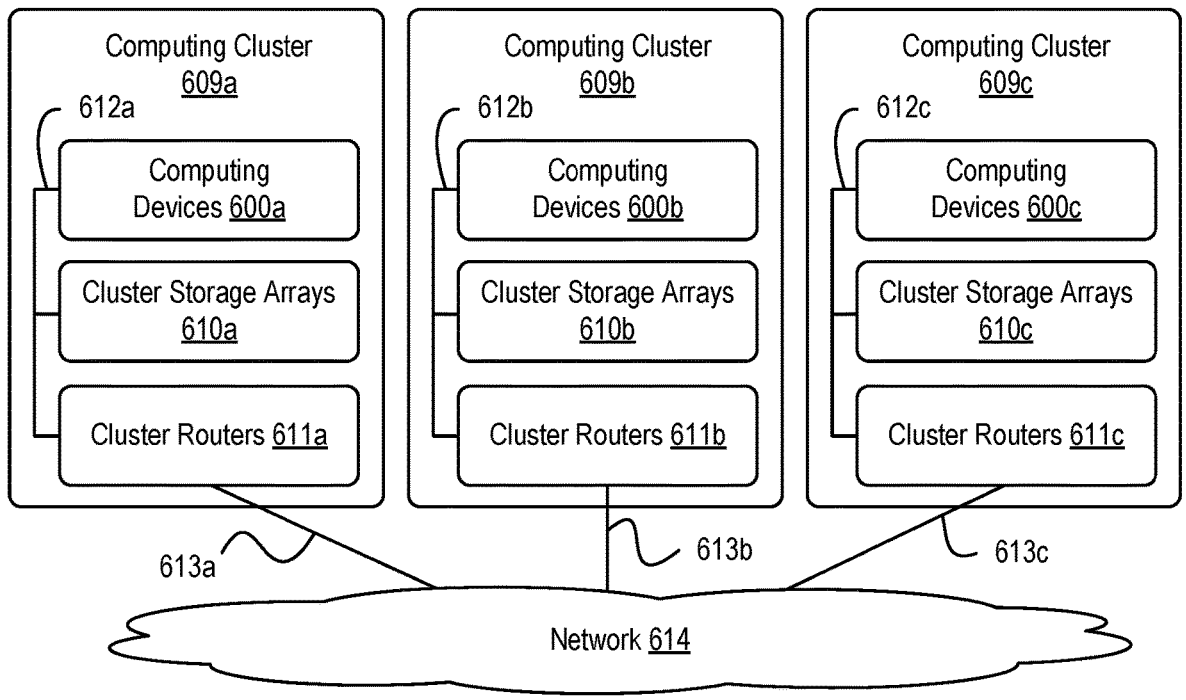
FIG. 6B illustrates a network of computing clusters arranged as a cloud-based server system, in accordance with example embodiments.

FIG. 6B depicts a network 614 of computing clusters 609a, 609b, 609c arranged as a cloud-based server system in accordance with example embodiments. Computing clusters 609a, 609b, 609c can be cloud-based devices that store program logic and/or data of cloud-based applications and/or services; e.g., perform at least one function related to one or more of: planning system 110, offboard planner 112, roadmap planner 114, robotic device 120, onboard software 130, hardware 150, system 200, warehouse management system 210, executor 220, network 318, onboard system 320, onboard sensors 322, planning/execution processors 324, network switch 330, central vehicle controller 332, programmable logic controller 334, vehicle master 336, device sensors 338, drives 340, robotic device architecture 400, laser scanner architecture 500, and any other methods or operations herein described.

In some embodiments, computing clusters 609a, 609b, 609c can be a single computing device residing in a single computing center. In other embodiments, computing clusters 609a, 609b, 609c can include multiple computing devices in a single computing center, or even multiple computing devices located in multiple computing centers located in diverse geographic locations. For example, FIG. 6B depicts each of computing clusters 609a, 609b, 609c residing in different physical locations.

In some embodiments, data and services at computing clusters 609a, 609b, 609c can be encoded as computer readable information stored in non-transitory, tangible computer readable media (or computer readable storage media) and accessible by other computing devices. In some embodiments, computing clusters 609a, 609b, 609c can be stored on a single disk drive or other tangible storage media, or can be implemented on multiple disk drives or other tangible storage media located at one or more diverse geographic locations.

In FIG. 6B, functionality of a planning system can be distributed among three computing clusters 609a, 609b, and 609c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of the computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of a planning system, a robotic device, and/or a computing device. In one embodiment, the various functionalities of a planning system, a robotic device, and/or a computing device can be distributed among one or more computing devices 600a, 600b, and 600c. Computing devices 600*b* and 600*c* in respective computing clusters 609*b* and 609*c* can be configured similarly to computing devices 600*a* in computing cluster 609*a*. On the other hand, in some embodiments, computing devices 600*a*, 600*b*, and 600*c* can be configured to perform different functions.

In some embodiments, computing tasks and stored data associated with a planning system, a robotic device, and/or a computing device can be distributed across computing devices 600*a*, 600*b*, and 600*c* based at least in part on the processing requirements of a roadmap editor, single agent planning software, multiple agent planning software, a routing computing device, and/or a computing device, the processing capabilities of computing devices 600*a*, 600*b*, and 600*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 610*a*, 610*b*, and 610*c* of the computing clusters 609*a*, 609*b*, and 609*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a planning system, a robotic device, and/or a computing device can be distributed across computing devices 600*a*, 600*b*, and 600*c* of computing clusters 609*a*, 609*b*, and 609*c*, various active portions and/or backup portions of these components can be distributed across cluster storage arrays 610*a*, 610*b*, and 610*c*. For example, some cluster storage arrays can be configured to store one portion of the data of a planning system, a robotic device, and/or a computing device can, while other cluster storage arrays can store other portion(s) of data of a planning system, a robotic device, and/or a computing device. Additionally, some cluster storage arrays can be configured to store backup versions of data stored in other cluster storage arrays.

The cluster routers 611*a*, 611*b*, and 611*c* in computing clusters 609*a*, 609*b*, and 609*c* can include networking equipment configured to provide internal and external communications for the computing clusters. For example, the cluster routers 611*a* in computing cluster 609*a* can include one or more internet switching and routing devices configured to provide (i) local area network communications between the computing devices 600*a* and the cluster storage arrays 610*a* via the local cluster network 612*a*, and (ii) wide area network communications between the computing cluster 609*a* and the computing clusters 609*b* and 609*c* via the wide area network connection 613*a* to network 614. Cluster routers 611*b* and 611*c* can include network equipment similar to the cluster routers 611*a*, and cluster routers 611*b* and 611*c* can perform similar networking functions for computing clusters 609*b* and 609*b* that cluster routers 611*a* perform for computing cluster 609*a*.

In some embodiments, the configuration of the cluster routers 611*a*, 611*b*, and 611*c* can be based at least in part on the data communication requirements of the computing devices and cluster storage arrays, the data communications capabilities of the network equipment in the cluster routers 611*a*, 611*b*, and 611*c*, the latency and throughput of local networks 612*a*, 612*b*, 612*c*, the latency, throughput, and cost of wide area network links 613*a*, 613*b*, and 613*c*, and/or other factors that can contribute to the cost, speed, fault-tolerance, resiliency, efficiency and/or other design criteria of the moderation system architecture.

IV. Example Obstacle Avoidance Operations

Figure 7:
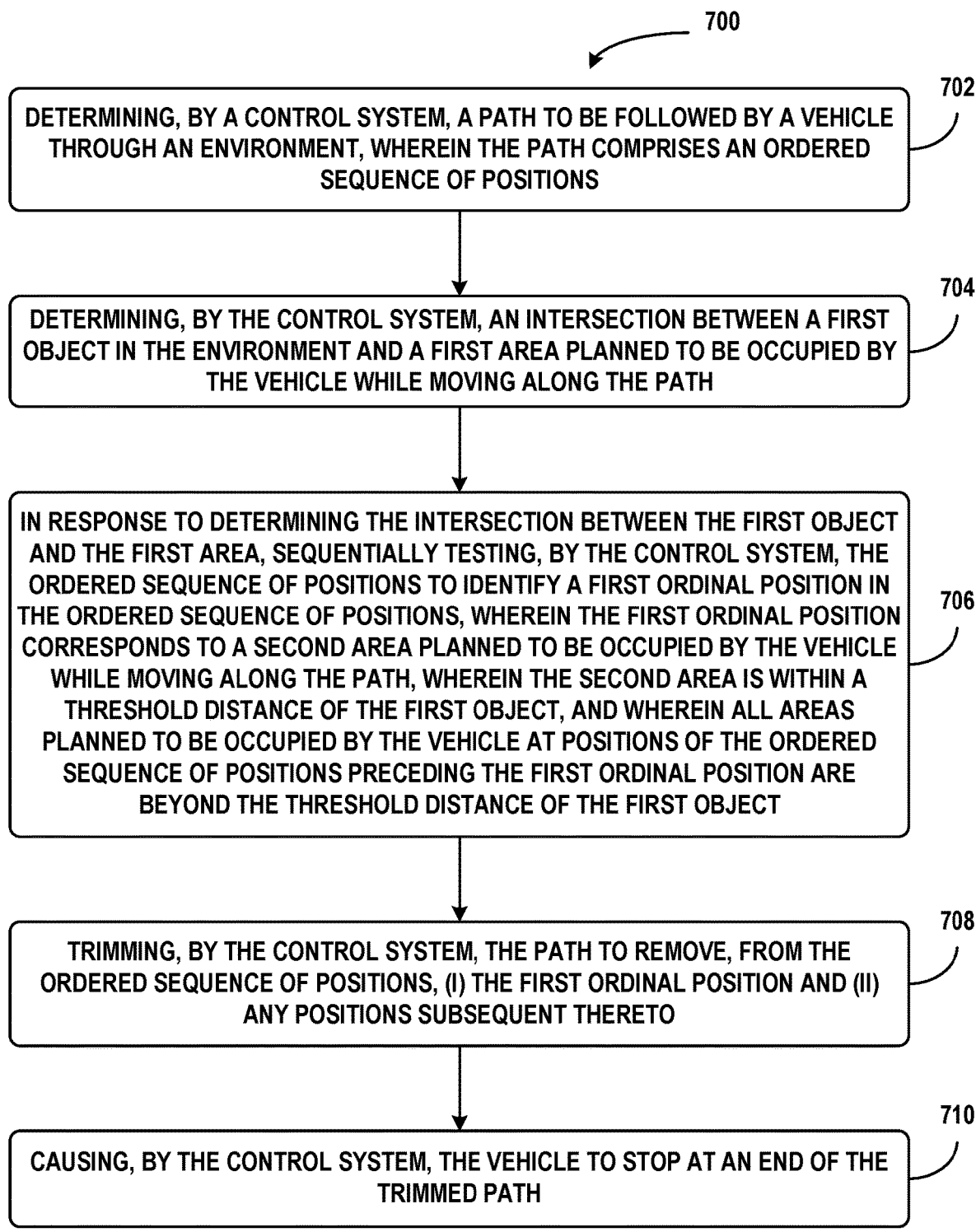
FIG. 7 illustrates a flow chart, in accordance with example embodiments.

FIG. 7 illustrates flow chart 700 of example operations related to avoidance of obstacles by robotic device(s) 120. These operations may be executed by planning system 110, robotic devices 120, warehouse management system 210, computing device 600, computing clusters 609*a-c*, or one or more other computing devices or systems, which may make up the control system discussed with respect to FIGS. 7-12. The operations of flow chart 700 may be performed in real time, and some or all of them may be repeated or updated periodically, for example, whenever updated sensor data becomes available (e.g., at a frequency of 50 Hz).

Block 702 may involve determining, by a control system, a path to be followed by a vehicle through an environment. The path may comprise an ordered sequence of positions. The vehicle may be any mobile robotic device capable of following the determined path.

Figure 8A:
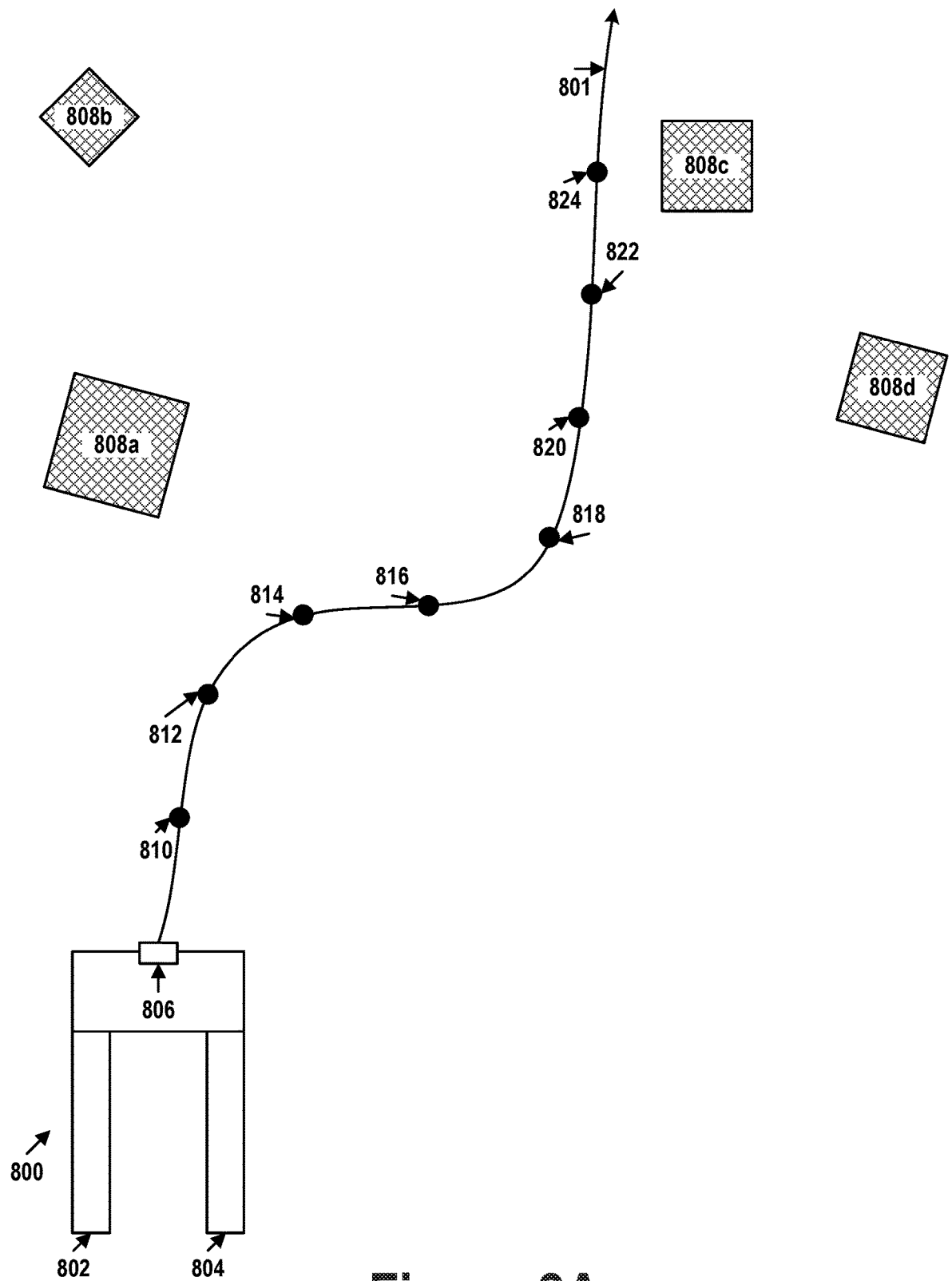
FIG. 8A illustrates a path through an environment, in accordance with example embodiments.

FIG. 8A illustrates a top-down view of vehicle 800 and path 801 determined for vehicle 800 to follow through an environment, in an example embodiment. Vehicle 800 may be a pallet jack or fork truck having tines 802 and 804. Tines 802 and 804 may allow vehicle 800 to interact with a pallet or another storage structure by placing the tines into slots within the pallet, thereby enabling pick-up, transportation, and drop-off of the pallet. Vehicle 800 may also include sensor 806 for scanning the environment, allowing for vehicle localization and obstacle detection within the environment, among other operations. The environment may include therein a plurality of objects 808*a*, 808*b*, 808*c*, and 808*d* (e.g., boxes or pallets).

Path 801 may run from (or may form part of a path running from) a starting position within the environment to target position within the environment. Path 801 may be planned around known or fixed obstacles (e.g., walls, pallet racks) in the environment based on kinematic and dynamic properties of vehicle 800. Path 801 may be made up of a plurality of discrete ordered positions 810, 812, 814, 816, 818, 820, 822, and 824 (i.e., positions 810-824). Positions 810-824 may be target positions for vehicle 800 to follow in sequence to move along path 801. In some embodiments, path 801 may represent sections of one or more roadmaps.

Before or while causing vehicle 800 to move along path 801, the control system may analyze path 801 to determine whether the path is free of obstacles. The analysis may involve using sensor 806 to scan the areas along path 801 predicted to be occupied by the vehicle to identify any objects situated therein.

Referring back to FIG. 7, block 704 may involve determining, by the control system, an intersection between a first object in the environment and a first area planned to be occupied by the vehicle while moving along the path.

In some implementations, determining the intersection between the first object and the first area may involve determining, by the control system, for each respective position of the ordered sequence of positions along the path, a vehicle footprint indicating an area within a map of the environment to be occupied by the vehicle at the respective position. The map may indicate the first object within the environment. However, in some implementations, the intersection between the first object and the first area may be determined in other ways, without using vehicle footprints.

In some embodiments, the map may be determined based on data from sensor 806, other sensors on other vehicles within the environment, or other sensors positioned at fixed locations within the environment. The map may represent a fusion of information from multiple different sensors, or from multiple different types of sensors. In some examples, the map may be a two-dimensional representation of the environment, and may be determined or updated by projecting representations of physical features within the environment detected by the sensors onto a plane defined by the two-dimensional representation of the environment. The map may represent a threshold extent of the environment around the vehicle (e.g., a 10 meter by 10 meter square centered around the vehicle). Alternatively, the map may represent the environment in three dimensions, and may therefore represent a volume of space centered around the vehicle.

In some embodiments, the map may be represented as an occupancy grid that includes a number of cells that represent corresponding areas in the environment. The control system may develop the occupancy grid within a coordinate frame that corresponds to a point-of-view (POV) of the sensor (e.g., sensor 806). Each cell may be assigned a state that indicates the status of the area represented by the cell. Particularly, a cell may be assigned as having an obstacle, free space, or unknown. Cells with obstacles may represent physical features within the environment, including fixed, movable, and mobile objects. Cells with free space may be traversable by the vehicle without striking objects in the environment. Unknown cells may require additional sensor data to determine whether the area includes an obstacle or not (i.e., has free space). The control system may periodically update and adjust the occupancy grid based on new measurements of the environment from sensors coupled to one or more vehicles navigating the environment.

Figure 8B:
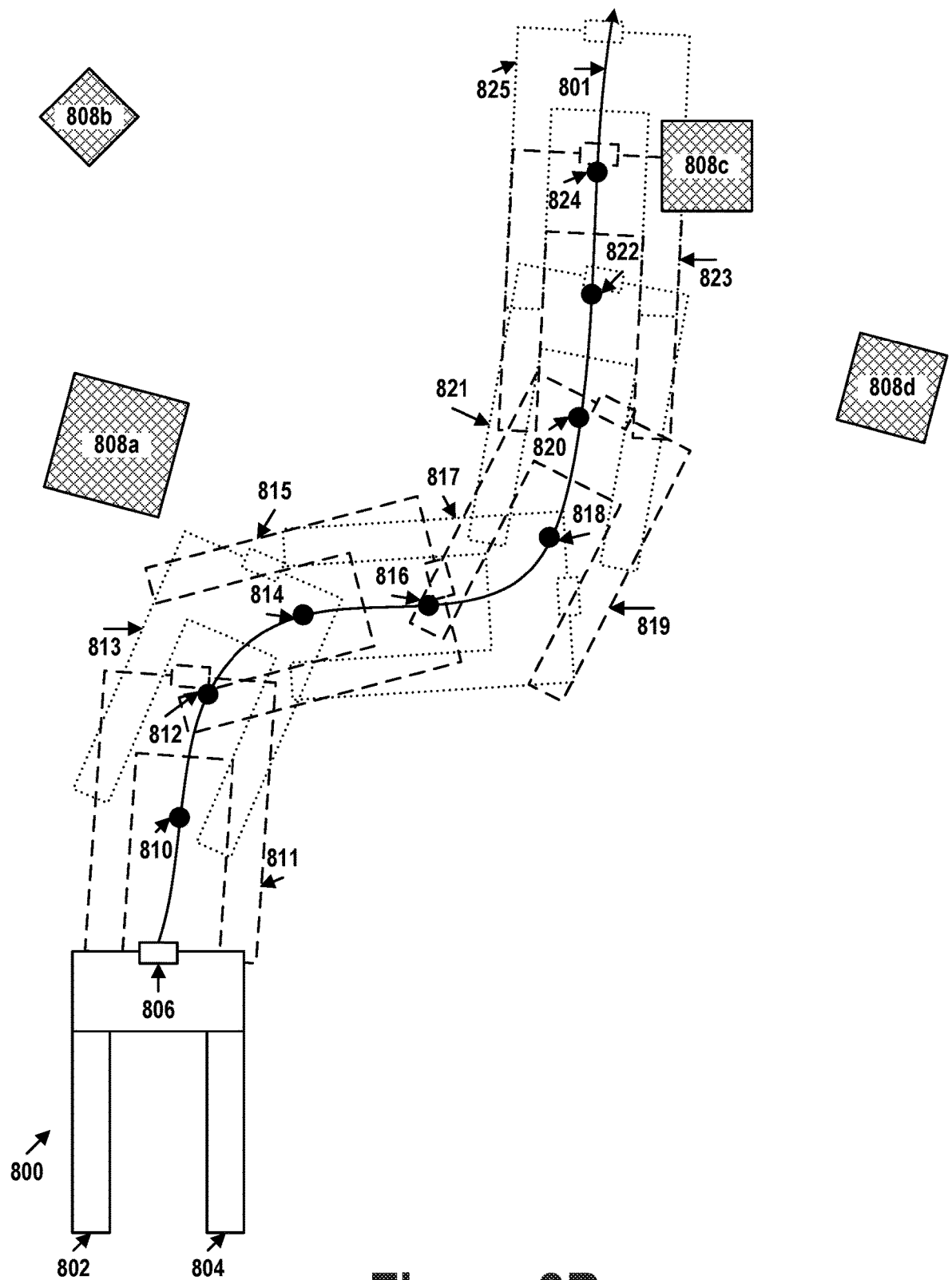
FIG. 8B illustrates vehicle footprints, in accordance with example embodiments.

FIG. 8B illustrates a plurality of vehicle footprints 811, 813, 815, 817, 819, 821, 823, and 825 (i.e., footprints 811-825) projected along path 801 at corresponding positions 810, 812, 814, 816, 818, 820, 822, and 824, respectively. Footprints 811-825 are shown with alternating line patterns for clarity. Each of footprints 811-825 indicates the area within the environment, or within the map representing the environment, that is planned to be occupied by vehicle 800 when vehicle 800 (e.g., the centroid of vehicle 800) is at the respective position along path 801. Footprint 811, for example, represents a first area within the environment planned to be occupied by vehicle 800 when the centroid of vehicle 800 reaches position 810, while footprint 813 represents a second area within the environment planned to be occupied by vehicle 800 when the centroid of vehicle 800 reaches position 812, and so on.

The pose (i.e., position and orientation) of footprints 811-825 may be determined based on the physical size of vehicle 800 (e.g., mass and volume), as well as the steering angles and velocities planned to be commanded to vehicle 800 to cause vehicle 800 to follow path 801. In some embodiments, each footprint, in addition to representing the area in the environment expected to be occupied by the vehicle, may include a buffer region around the area. For example, each footprint might be 10% larger than an actual physical size of vehicle 800 to account for errors in sensing, vehicle positioning, and simulation, among others.

In some embodiments, the density of positions 810-824, and thus the density of footprints 811-825, may be greater or smaller than that shown in FIGS. 8A-8E (i.e., additional positions may be included between positions 810-824, or positions may be removed). Footprints 811-825 may operate as a filter to identify a subset of objects within the environment that constitute obstacles along path 801. That is, footprints 811-825 may be used to determine whether any of objects 808a-808d constitute obstacles along path 801 with which vehicle 800 is expected to collide.

Referring back to FIG. 7, determining the intersection between the first object and the first area in block 704, may, in some implementations, also involve determining, by the control system, that a first vehicle footprint of the determined vehicle footprints intersects with the first object indicated by the map.

Figure 8C:
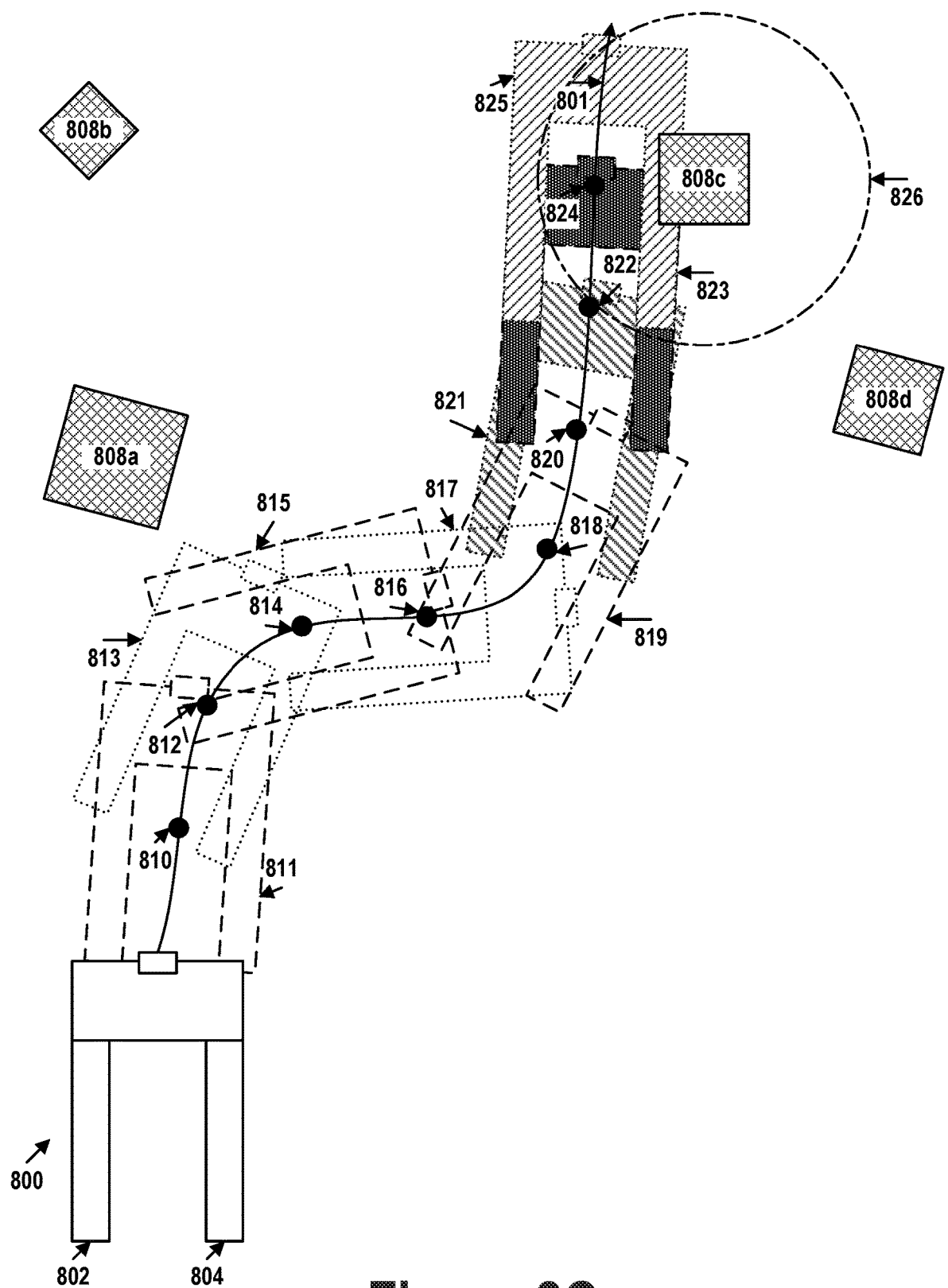
FIG. 8C illustrates an obstacle buffer, in accordance with example embodiments.

FIGS. 8B and 8C show that footprints 823 and 825 each intersect with object 808c. As vehicle 800 approaches position 822 along path 801, vehicle 800 is very likely to collide with object 808c, potentially causing damage to vehicle 800 or object 808c. In order to avoid such a collision, path 801 may be trimmed or shortened to prevent vehicle 800 from coming within a threshold distance of object 808a. Vehicle 800 may be caused to slow to a stop as it approaches the end of the trimmed path, thereby avoiding the collision with object 808c.

Referring back to FIG. 7, block 706 may involve, in response to determining the intersection between the first object and the first area, sequentially testing, by the control system, the ordered sequence of positions to identify a first ordinal position in the ordered sequence of positions, where the first ordinal position corresponds to a second area planned to be occupied by the vehicle while moving along the path, where the second area is within a threshold distance of the first object, and where all areas planned to be occupied by the vehicle at positions of the ordered sequence of positions preceding the first ordinal position are beyond the threshold distance of the first object.

FIG. 8C illustrates object 808c, with which vehicle 800 is predicted to collide, surrounded by a buffer 826 (i.e., an obstacle buffer). The buffer may be a circle having a radius equal to the threshold distance (i.e., a first threshold distance or a collision threshold distance). Alternatively, in some embodiments, the buffer may have a shape similar to the shape of the first object and may be offset from a perimeter thereof by the threshold distance. Thus, the buffer around object 808c, for example, might be a square circumscribed around the circle making up buffer 826. The buffer may be applied to any obstacles with which at least one footprint is determined to intersect.

In some embodiments, the first threshold distance may be equal to or greater than a maximum distance needed for vehicle 800 to come to a stop, and may thus be based on physical and kinematic properties of vehicle 800 (e.g., speed, mass, load carried, etc.). Buffer 826 may thus allow vehicle 800 to be stopped short of obstacle 808c.

To avoid a collision between vehicle 800 and object 808c, the control system may determine the first ordinal footprint, and thus the first ordinal position along path 801, that falls within buffer 826 or any other obstacle buffer. In FIG. 8C, portions of each of footprints 821, 823, and 825 are within buffer 826, and are marked with alternating patterns to indicate this intersection with buffer 826. Footprint 821 is the first ordinal footprint, and position 820 is thus the first ordinal position, along path 801 that falls within buffer 826. Vehicle 800 may begin to exceed a threshold risk of collision with object 808c if vehicle 800 reaches position 820 while moving along path 801.

The term "ordinal" is herein used to describe a position or index within an ordered sequence or a subset thereof. Thus, for example, positions 810, 812, and 814 represent a first, a second, and a third ordinal position of positions 810-824 along path 801, respectively. Similarly, footprints 821, 823, and 825 represent a first, a second, and a third ordinal footprint of a first subset of footprints 811-825, where the first subset includes only footprints intersecting with or located within buffer 826.

In an example embodiment, determining, from within ordered sequence of positions 810-824, the first ordinal position (i.e., position 820) which corresponds to a vehicle footprint (i.e., footprint 821) that is within the threshold distance of the first object may involve scanning or analyzing positions 810-824 in sequence, starting with position 810 and moving towards position 824, until a position whose corresponding footprint intersects buffer 826 is found. In another embodiment, each of positions 810-824 may be associated with a numerically consecutive index representing the position's place within the ordered sequence 810-824. Accordingly, determining the first ordinal position may involve selecting, from a group of positions (e.g., 820, 822, and 824) corresponding to footprints (e.g., 821, 823, and 825) that intersects with region 826, a position having a smallest index value (e.g., 820).

Notably, identifying the objects that intersect with the vehicle footprints before applying the buffer regions, and applying the buffer region to only the identified intersecting objects, allows an extent of false-positive detections of collisions to be reduced. On the other hand, applying buffer regions to all objects within the environment, regardless of their intersection with vehicle footprints, and subsequently searching for intersections between the buffer regions and the projected vehicle footprints to identify objects constituting obstacles would result in numerous false-positive collision detections, and would thus unnecessarily impede progress of vehicle 800 through the environment.

Referring back to FIG. 7, block 708 may involve trimming, by the control system, the path to remove, from the ordered sequence of positions, (i) the first ordinal position and (ii) any positions subsequent thereto. Trimming the path in this way may prevent the vehicle from reaching positions which would result in the vehicle colliding with the first object, or coming within a threshold distance of colliding with the first object.

Figure 8D:
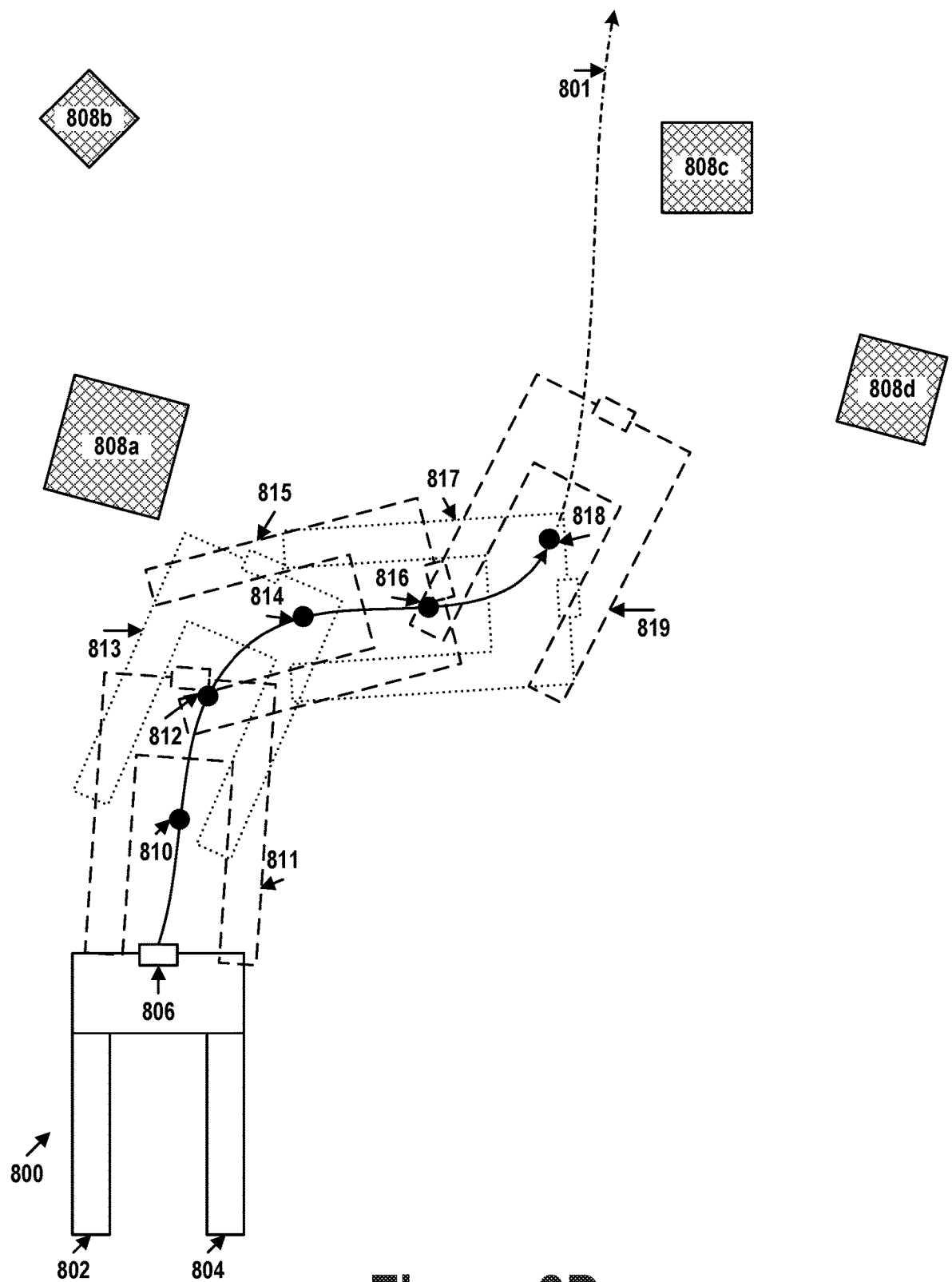
FIG. 8D illustrates a trimmed path, in accordance with example embodiments.

FIG. 8D illustrates path 801 trimmed to remove therefrom positions 820, 822, and 824, resulting in a shortened path which includes positions 810, 812, 814, 816, and 818. Upon reaching position 818 of the trimmed path, vehicle 800 may be caused to stop to avoid moving to within buffer 826 around obstacle 808*c*.

Referring back to FIG. 7, block 710 may involve causing, by the control system, the vehicle to stop at an end of the trimmed path. The vehicle may remain stopped until the control system determines an alternative path for the vehicle to follow, or, if a path around the obstacle is not available, the obstacle is cleared.

Figure 8E:
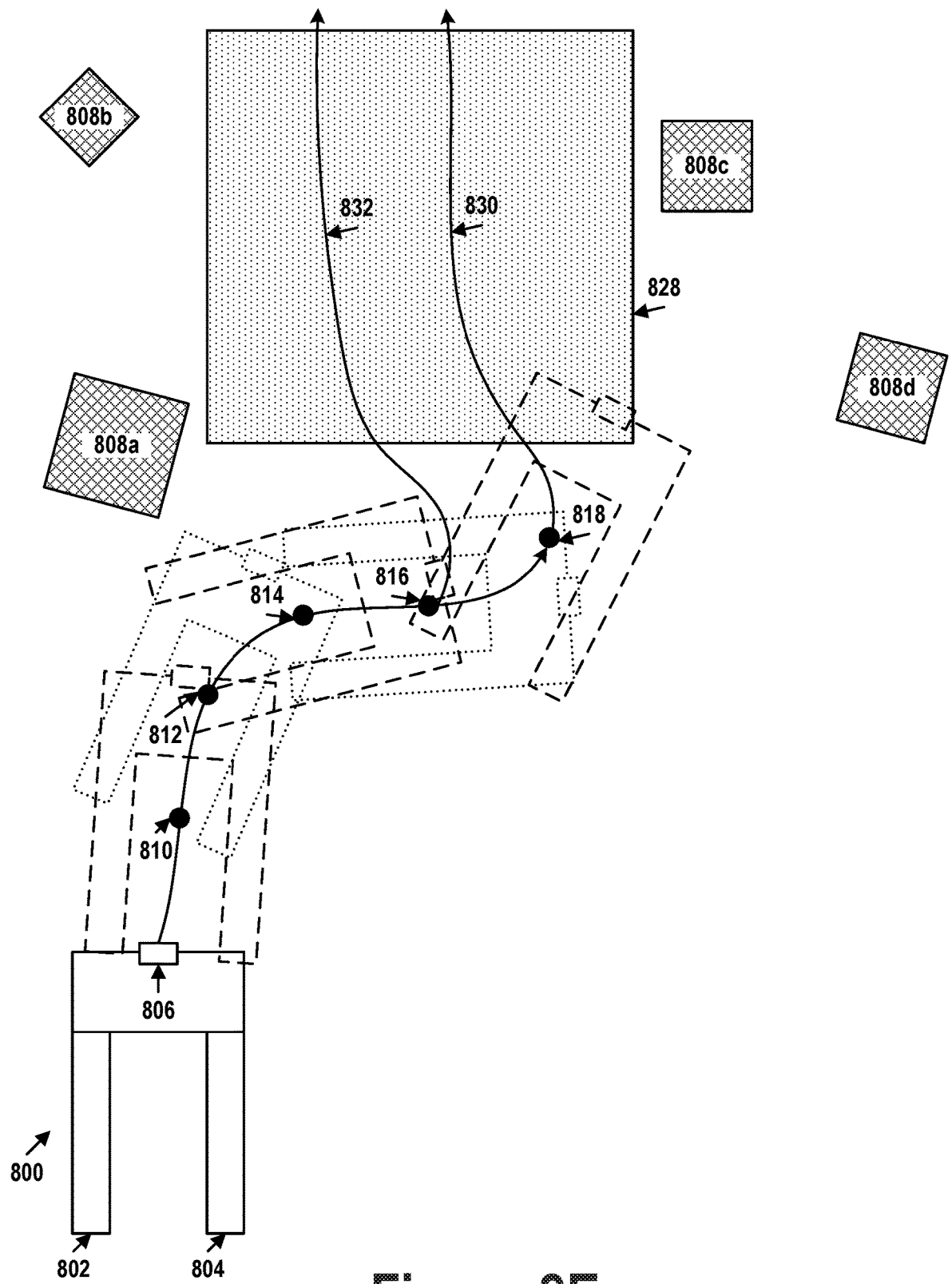
FIG. 8E illustrates alternative paths, in accordance with example embodiments.

FIG. 8E illustrates planning of an alternative path to allow vehicle 800 to drive around obstacle 808*c*. The control system may determine a region of available space 828 in the environment that is traversable by vehicle 800 to reach a target location to which path 801 originally lead. The control system may further determine one or more alternative paths 830 and 832 for vehicle 800 to follow after the trimmed path and through region 828. For example, if vehicle 800 has already reached and stopped at position 818 at the time when region 828 is determined, vehicle 800 may be caused to follow alternative path 830 which follows from position 818. In another example, if vehicle 800 has not yet reached position 816 at the time when region 828 is determined, vehicle 800 may be caused to follow alternative path 832 which follows from position 816.

In an example embodiment, once path 801 is trimmed, vehicle 800 may request, from offboard planner 112 shown in FIG. 1, the region of available space and the alternative paths. Vehicle 800 may determine, based data from sensor 806, for example, region 828 of free space that vehicle 800 might use to navigate around obstacle 808*c*. Vehicle 800 may then request, from offboard planner 112, permission to occupy region 828. Alternatively, offboard planner 112 may determine region 828. Offboard planner 112 may determine alternative paths 830 and 832 through region 828 while ensuring that these alternative paths do not intersect with regions or paths assigned to other vehicles in the environment managed by offboard planner 112. Further, motion of vehicle 800 along paths 830 or 832 may be synchronized with movements of the other vehicles in the environment to avoid collisions.

In some embodiments, region 828 and paths 830 and 832 may represent or correspond to sections or portions of a roadmap. For example, region 828 may be mapped to one or more roads within a roadmap of the environment, and paths 830 and 832 may represent portions of the one or more roads.

In another example embodiment, the path determined by the control system may include an executable path portion and a tentative path portion. The executable path portion may be determined to be free of obstacles and may be commanded to be followed by the vehicle. The tentative path portion might be a candidate path for the vehicle which may need to be scanned for obstacles before it is assigned to a vehicle as an executable path.

The control system may cause the vehicle to follow the executable path portion and, while the vehicle follows the executable path portion, cause a sensor connected to the vehicle to scan the tentative path portion to detect any obstacles situated along the tentative path portion. If an obstacle is detected, the tentative path portion may be trimmed to remove therefrom any positions potentially resulting in a collision, as described above. In response, the control system may determine an alternative tentative path for the vehicle to scan and potentially follow after the executable path portion or after the trimmed tentative path portion, thus allowing the vehicle to avoid any obstacles along the tentative path portion. In some embodiments, the alternative tentative path may be determined before the vehicle reaches the end of the trimmed path, thus potentially allowing the vehicle to proceed through the environment without having to stop at the end of the trimmed path.

In some instances, evaluating both the executable path portion and the tentative path portion may assist with detecting obstacles along the tentative path portion that result in both the tentative path portion as well as a section of the executable path portion being trimmed. Namely, when an obstacle intersects the tentative path portion near the beginning of the tentative portion, but does not intersect the executable path portion, the buffer around that obstacle may cause the control system to trim the tentative path portion as well as the executable path portion. On the contrary, if the control system had not evaluated the tentative path portion for potential collisions until after the vehicle traversed the executable path portion, vehicle footprints at or near the end of the executable path portion might be too close to the obstacle (i.e., within the collision threshold distance), thus resulting in the vehicle inadvertently coming within the collision threshold distance.

In some embodiments, multiple tentative paths may be determined and analyzed for collisions. Each of the multiple tentative paths may be trimmed according to the obstacles intersecting with the vehicle footprints projected therefor. From the trimmed multiple tentative paths, a longest tentative path or a tentative path that maximizes a vehicle velocity through the environment may be selected to be executed by the vehicle.

In some instances, multiple obstacles may be determined to intersect with one or more vehicle footprints. For example, in FIGS. 8A-8E, object 808d might be closer to path 801 and might therefore intersect with footprints 819 or 821. In such a case, the collision avoidance operations herein described might be performed only for an obstacle closest to a current position of vehicle 800 (i.e., obstacle 808d) or an obstacle intersecting with a footprint associated with a lowest ordinal position along the ordered sequence of positions 810-824, since performing the operations for any other obstacles may be redundant. That is, the first obstacle along path 801 may necessitate path 801 to be trimmed to a greater extent than any other obstacle, and might be the only one considered by the control system for a given path. When multiple obstacles intersect with a same footprint (e.g., the footprint associated with the lowest ordinal position along the ordered sequence of positions 810-824), each of the multiple intersecting obstacles may be considered in trimming the path. That is, the first ordinal position may be one that corresponds to a vehicle footprint that is within the threshold distance of any one of the multiple intersecting obstacles. The path may thus be trimmed to stop the vehicle at least the buffer distance away from the closest one of the multiple intersecting obstacles.

V. Example Vehicle Velocity Trajectories

In addition to stopping vehicle 800 at the end of the trimmed path to avoid collisions, the determined vehicle footprints 811-825 may be used to manage a speed of the vehicle through the environment to allow for safe traversal of the path. The control system may determine, for each respective position of the ordered sequence of positions along the trimmed path, a target velocity for the vehicle. Notably, by projecting vehicle footprints 811-825 before vehicle 800 arrives at the corresponding positions 810-824, vehicle 800 may be smoothly slowed to a stop, thus preventing any objects carried by vehicle 800 from shifting, becoming unbalanced, or falling off. This approach may create smoother velocity transitions than those resulting from a collision avoidance safety system of vehicle 800 utilizing protective fields and warning fields.

Figure 9:
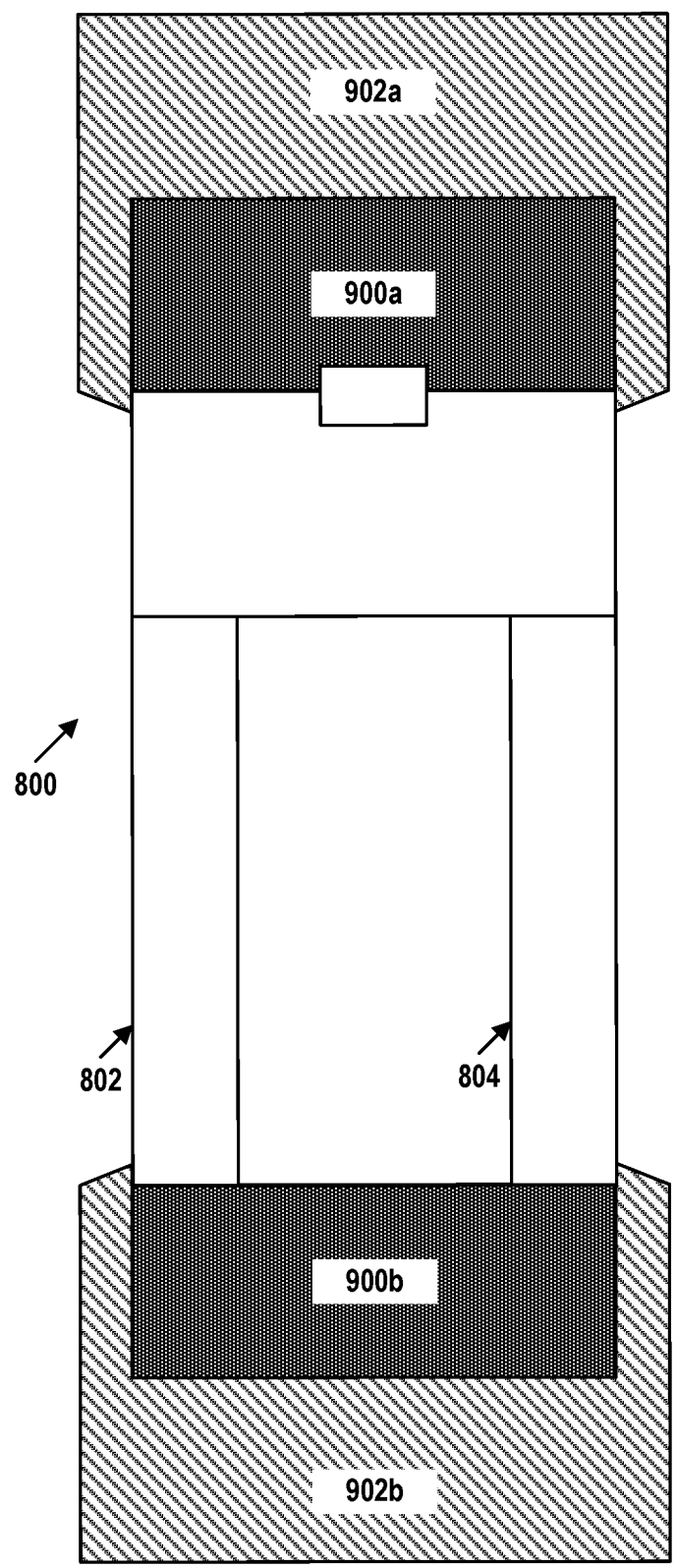
FIG. 9 illustrates protective and warning fields of a vehicle, in accordance with example embodiments.

FIG. 9 illustrates aspects of an example collision avoidance safety system of vehicle 800. The safety system might include protective fields 900a and 900b in front of and behind vehicle 800, respectively, as well as warning fields 902a and 902b in front of and behind vehicle 800, respectively. Fields 900a, 900b, 902a, and 902b may be defined in software by the safety system. The safety system may be configured to cause vehicle 800 to travel under a threshold speed when an object is detected within warning field 900a or 900b. Similarly, the safety system may be configured to cause vehicle 800 to come to a stop when an object is detected within protective field 902a or 902b. Sizes of fields 900a, 900b, 902a, and 902b may be scaled based on the velocity of vehicle 800.

Figure 10A:
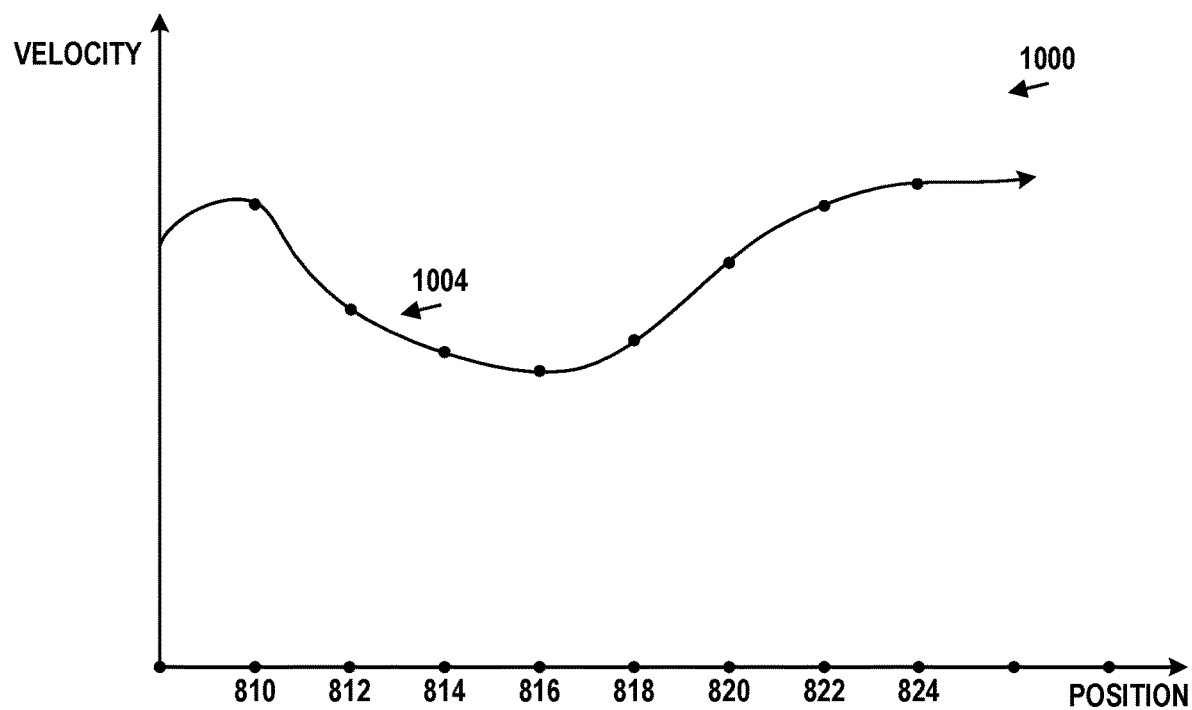
FIG. 10A illustrates a velocity trajectory, in accordance with example embodiments.
Figure 10B:
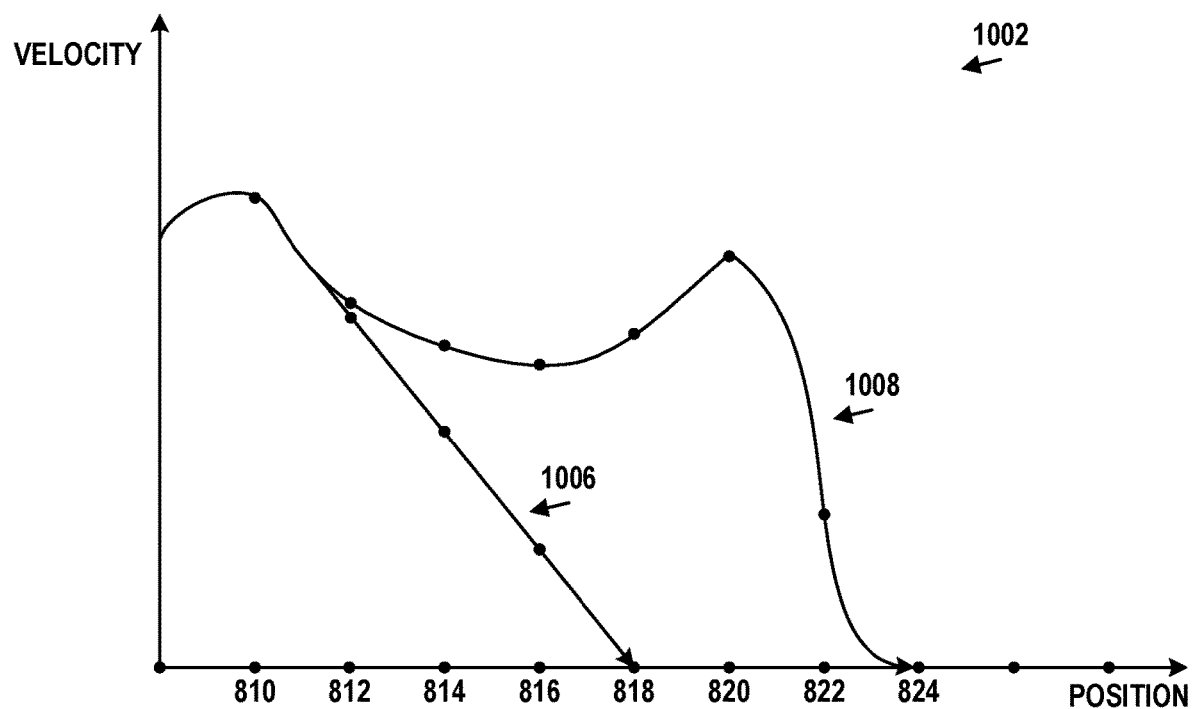
FIG. 10B illustrates an alternative velocity trajectory, in accordance with example embodiments.

FIGS. 10A and 10B illustrate differences between velocity trajectories achieved by the safety system of vehicle 800 and the operations described with respect to FIGS. 7-8E.

Vehicle 800 may initially be commanded to traverse points 810-824, as illustrated in FIGS. 8A-8C, according to velocity trajectory 1000, as shown in FIG. 10A. As vehicle 800 traverses points 810-824, object 808c may be determined to be an obstacle and thus vehicle 800 may be caused to come to a stop to avoid colliding with object 808c.

When vehicle 800 relies only on its safety system to avoid object 808c, vehicle 800 may end up following velocity trajectory 1008 as it moves across positions 810-824 and eventually comes to a stop before striking the obstacle. Because the safety system will not cause vehicle 800 to slow down until object 808c enters one of warning fields 902a or 902b, the safety system will begin to slow the vehicle at approximately position 820, when object 808c enters warning field 902a. The rate of deceleration will increase as object 808c enters protective field 900a, and vehicle 800 is forced to an abrupt stop before reaching position 824.

On the other hand, when vehicle 800 relies on the control system carrying out the operations described with respect to FIGS. 7-8E, vehicle 800 may end up following velocity trajectory 1006 as it moves across positions 810-818. The operations of flow chart 700 may be performed before vehicle 800 reaches position 812, therefore identifying object 808c as an obstacle much earlier than the safety system would using the protective and warning fields. As a result of this early identification of obstacle 808c, vehicle 800 may be slowed to a stop with a smaller average and instantaneous deceleration.

Notably, vehicle 800 may come to a stop from approximately the same velocity over four position intervals (i.e., 810-812, 812-814, 814-816, and 816-818) when following velocity trajectory 1006 and less than two position intervals (i.e., 820-822 and part of 822-824) when following velocity trajectory 1008. In other words, the operations of flow chart 700 increase a distance over which vehicle 800 is able to modulate its velocity to come to a stop to avoid colliding with obstacle 808c, resulting in lower deceleration of vehicle 800 when compared with the safety system. Thus, any payload carried by vehicle 800 may experience fewer disturbances and vehicle 800 may be more likely to stop in time to avoid the obstacle, among other benefits.

In some implementations, the operations described with respect to FIGS. 7-8E may be used to determine a velocity trajectory for vehicle 800 as it moves along a path, regardless of whether an obstacle is detected that intersects with footprints 811-825. Namely, vehicle speed buffers may be placed around each object detected within the environment (e.g., 808a-808d). The vehicle speed buffers may be used to detect whether any of footprints 811-825 are within a second threshold distance (i.e., a speed threshold distance) of the objects within the environment, and may be structured much like buffer 826. When the control system determines, for example, that footprint 813 is situated within the second threshold distance of object 808a, but does not intersect with object 808a itself, a speed of vehicle 800 at position 812 may be limited to a first speed limit. The first speed limit may reduce the probability of any variations in positioning of vehicle 800 around position 812 resulting in a collision with object 808a, may allow vehicle 800 to comply with any relevant safety standards regarding the allowed speed of autonomous vehicles near objects within the environment, and may be used to slow vehicle 800 to a speed such that any velocity-based protective and/or warning fields thereof do not intersect with object 808a.

In some examples, the second threshold distance may be smaller than the first threshold distance so that the vehicle speed buffers are less sensitive to detection of nearby vehicle footprints than the buffer 826. For example, the second threshold distance may be 50 centimeters and the first threshold may be 3 meters. Alternatively, the second threshold distance may be equal to or greater than the first threshold distance.

Further, in some examples, the control system may be configured to classify detected objects into a plurality of categories and determine the first or second threshold distance for each object based on the category into which the object is classified. Classification may be performed using, for example, a machine learning algorithm (e.g., artificial neural networks applied to images from a ToF camera). For example, objects may be generally classified into fixed objects (e.g., walls, pallet racks) and non-fixed objects (e.g., boxes, pallets, vehicles), with fixed objects assigned smaller threshold distances than non-fixed objects. Object may also be classified into more specific categories, such as pallet jack, human, pallet, box, stationary robot, etc., depending on the contents of the environment in which the vehicle is operating.

A pallet jack may be assigned larger threshold distances than, for example, a pallet because the pallet jack includes tines protruding therefrom, whereas the pallet is generally not expected to have physical features protruding therefrom. Thus, the larger threshold may facilitate avoidance of the tines in the event that the tines, or a portion thereof, are not detected by sensors and indicated within the map of the environment. Further, in addition to classification, the control system may determine an orientation of the object, and determine the buffer region based on the orientation. For example, an orientation of a pallet jack located near the path may allow the control system to predict a position of tines thereof, which might not be indicated on the map of the environment. In some embodiments, classification of the obstacle blocking the path may be used to determine a course of action for avoiding the obstacle (e.g., go around obstacle, wait for obstacle to move, wait for operator, etc.).

Yet further, in some examples, the control system may be configured to determine a task to be performed by the vehicle in the environment, and determine the first or second threshold distance based on the task. For example, when vehicle is carrying a load, the first and second thresholds may be set at values larger than if the vehicle were moving without a load. The larger thresholds may provide additional clearance for any portions of the load extending beyond the physical size of the vehicle, as well as additional stopping distance in the event an obstacles is detected. Increasing the size of the first and second thresholds rather than placing a larger buffer around the vehicle footprints may allow safer operation without increasing the number of detected potential collisions (e.g., false positives).

In some embodiments, obstacles may be classified into fixed (not moveable), static (movable but not moving), or mobile (movable and moving) obstacles. For mobile obstacles, the control system may determine expected paths of the mobile obstacles, and project footprints of the mobile obstacles along the expected paths. The control system may then determine whether any of the vehicle footprints intersect with any of the obstacle footprints and apply buffers around any obstacle or obstacle footprints that intersect with at least one vehicle footprint. Further, in some examples, the expected obstacle path and the vehicle path may be synchronized in time. The control system may thus determine whether any of the obstacle footprints intersect with any of the vehicle footprints in space and time, and apply buffers around obstacles or obstacle footprints that intersect with at least one vehicle footprint in both space and time.

VI. Example Applications of the Obstacle Avoidance Operations

Figure 11A:
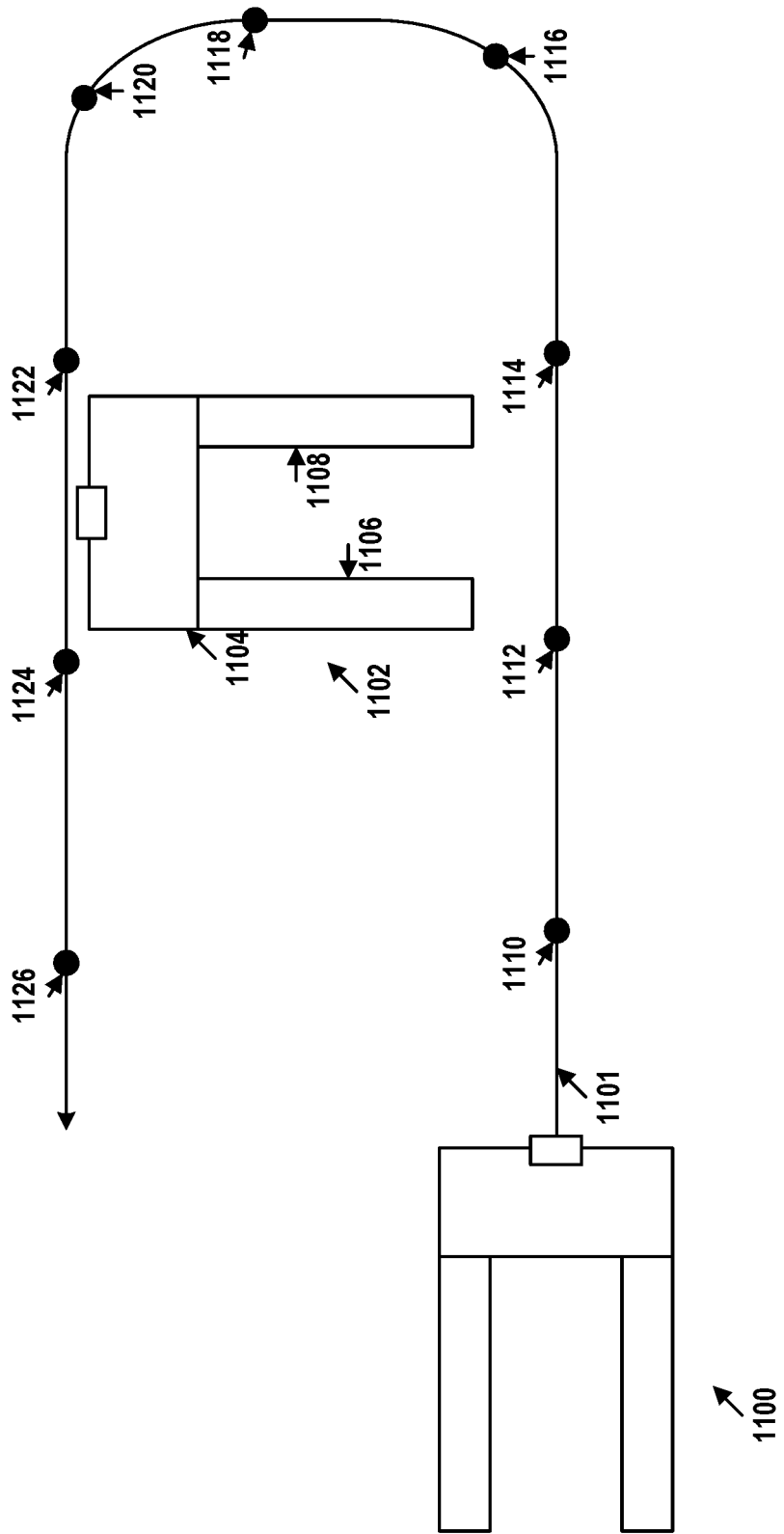
FIG. 11A illustrates another path through an environment, in accordance with example embodiments.

FIGS. 11A, 11B, 11C, and 12 illustrate example scenarios where the operations herein described may improve obstacle detection and improve throughput of vehicle operations within the environment. FIG. 11A illustrates vehicle 1100 which, much like vehicle 800, may be commanded to follow path 1101 through an environment. Another vehicle 1102, having a body 1104 and tines 1106 and 1108, may be situated within the environment. Path 1101 may include an ordered sequence of positions 1110, 1112, 1114, 1116, 1118, 1120, 1122, 1124, and 1126 (i.e., positions 1110-1126) for vehicle 1100 to follow. Path 1101 starts with a first section (e.g., positions 1110, 1112, and 1114) and ends with a second section (e.g., positions 1122, 1124, and 1128) parallel, adjacent, and connected to the first section by a third section (e.g., positions 1116, 1118, and 1120). That is, path 1101 doubles back on itself. Such paths may arise frequently in warehouse aisles, for example.

In some embodiments, obstacles within the environment may be detected based on data from a sensor configured to detect obstacles along a first plane parallel to and situated a first distance above a ground surface of the environment. The sensor may be, for example, a 2D Light Detection and Ranging (LIDAR) device configured to rotate with respect to vehicle 1100 and scan the environment along the first plane. Accordingly, physical features within the environment that are above or below the first plane might be undetected by the sensor and therefore not shown in the map of the environment. For example, while body 1104 of vehicle 1102 might intersect with the first plane and may therefore be detected, tines 1106 and 1108 might be situated below the first plane and may therefore be undetected. In some embodiments, the system may use a sensor with a field of view that encompasses tines 1106 and 1108. However, tines 1106 and 1108 may be positioned close to the ground and may therefore still be difficult to detect. Nevertheless, the obstacle avoidance operations herein described may be used to allow vehicle 1100 to avoid colliding with tines 1106 and 1108 of vehicle 1102.

Figure 11B:
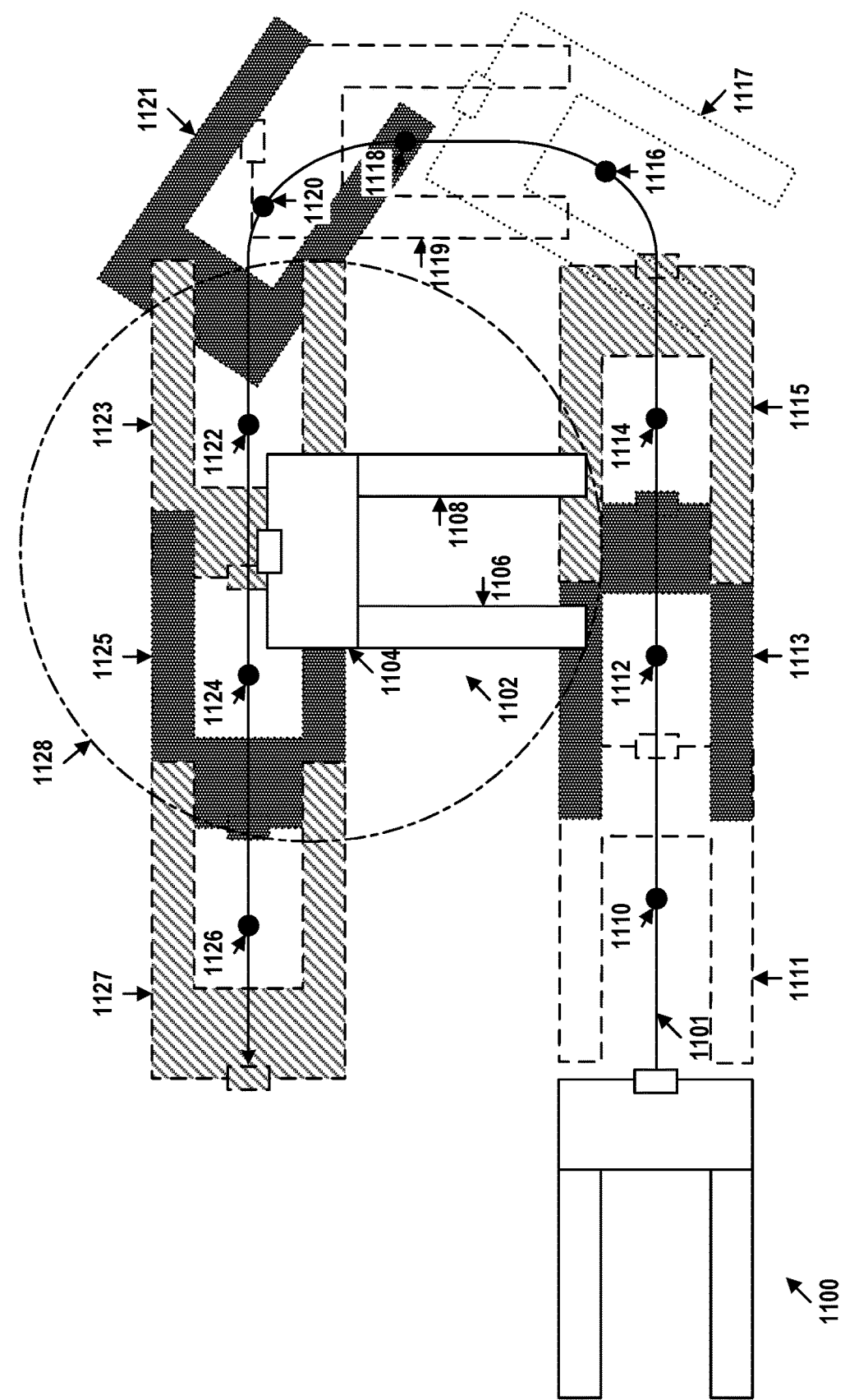
FIG. 11B illustrates additional vehicle footprints and an obstacle buffer, in accordance with example embodiments.

A control system may determine, for each respective position of ordered sequence of positions 1110-1126 along path 1101, a vehicle footprint indicating an area within a map of the environment to be occupied by the vehicle at the respective position. Thus, the control system may determine footprints 1111, 1113, 1115, 1117, 1119, 1121, 1123, 1125, and 1127 (i.e., footprints 1111-1127), as illustrated in FIG. 11B. The control system may also identify body 1104, but not tines 1106 and 1108, of vehicle 1102 as potential obstacles indicated within the map of the environment. The control system may further determine that footprints 1123 and 1125 each intersect with body 1104 of vehicle 1102. Intersection of body 1104 with footprints 1123 and 1125 may thus serve as a proxy signal to indicate that body 1104 of vehicle 1102 constitutes an obstacle having difficult-to-detect parts protruding therefrom (i.e., tines 1106 and 1108).

Notably, because tines 1106 and 1108 are not indicated in the map of the environment due to their positioning below the sensor's plane of detection, the control system might not determine that footprints 1113 and 1115 intersect with tines 1106 and 1108. However, by utilizing a sufficiently large buffer 1128 around body 1104 of vehicle 1102, tines 1106 and 1108 may nevertheless be avoided by vehicle 1100. The threshold distance defined by buffer 1128 may, for example, be based on the control system classifying body 1104 of vehicle 1102 as a body of a pallet jack. In response to this classification, the control system may determine a buffer within a threshold distance of the body that is sufficiently large to encompass an expected size of tines 1106 and 1108. Alternatively, the threshold distance defined by buffer 1128 may be based on a size of body 1104 (e.g., size of buffer 1128 may be proportional to a size of the detected obstacle), or may be a predetermined value, among other possibilities.

In response to determining that vehicle footprints 1123 and 1125 intersect with vehicle body 1104, the control system may determine a first ordinal position along the ordered sequence of positions which corresponds to a vehicle footprint that is within a threshold distance of the first object. By scanning each footprint along path 1101, or by scanning only footprints within buffer 1128, the control system may identify vehicle footprint 1113 as a first ordinal footprint within the threshold distance of the vehicle body 1104, and thus position 1112 as the first ordinal position.

Figure 11C:
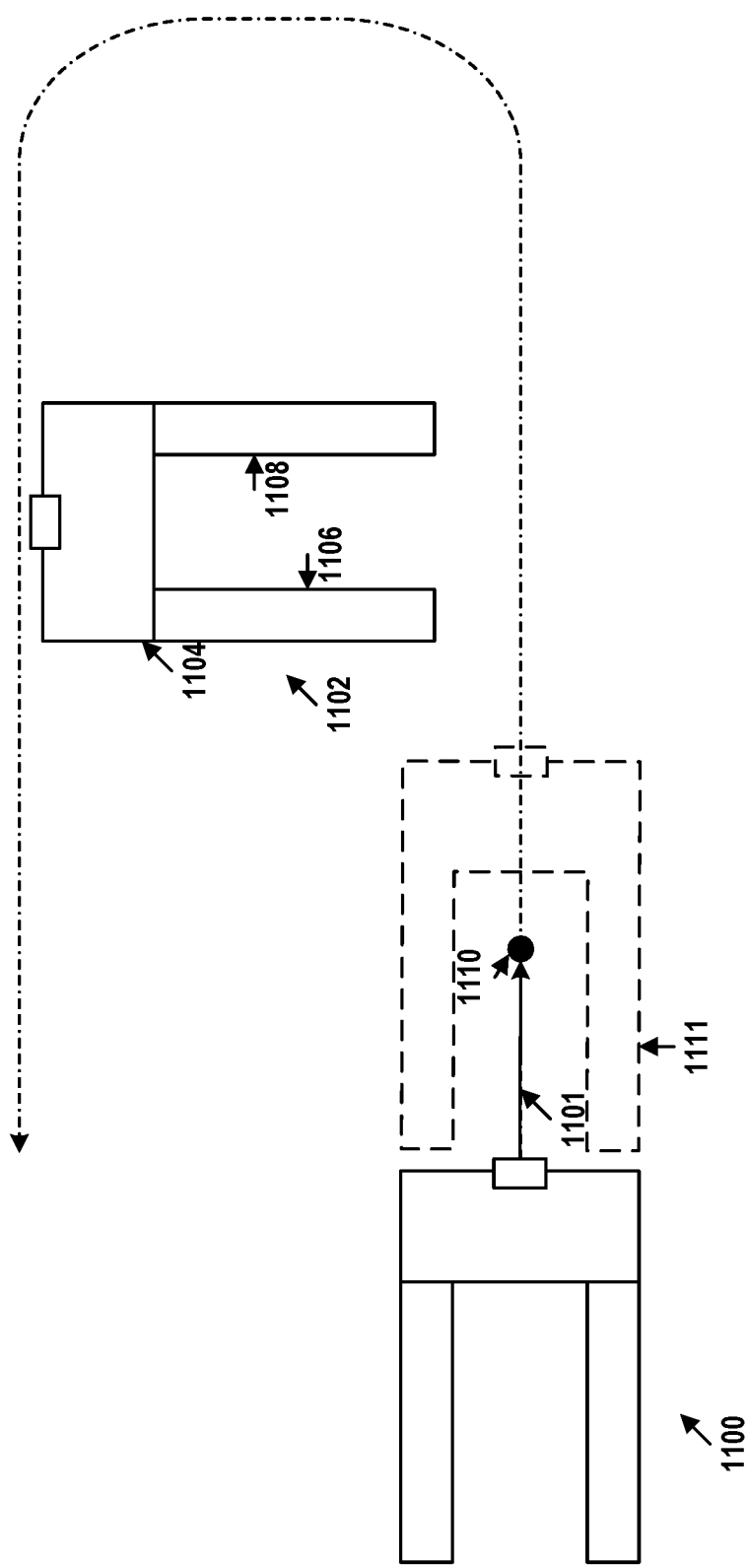
FIG. 11C illustrates another trimmed path, in accordance with example embodiments.

The control system may then trim path 1101 to remove therefrom position 1112 and positions 1114-1127 subsequent to position 1112, as illustrated in FIG. 11C. Vehicle 1100 may be caused to traverse trimmed path 1101 and may be caused to stop at position 1110, representing the end of the trimmed path, to avoid vehicle 1102. Notably, tines 1106 and 1108 may be avoided in spite of not having been indicated on the map of the environment.

Notably, when the path to be followed by the vehicle is linear, the first ordinal position may be determined by selecting a position along the path that precedes, by the threshold distance, the position at which a vehicle footprint first intersects with the obstacle (i.e., by "walking back" from the first vehicle footprint intersecting the obstacle by the threshold distance). Thus, buffer region 1128 might not need to be determined or used for linear paths. However, when the path is not linear (e.g., when the path doubles-back on itself like path 1101), buffer region 1128 may be used to more accurately enforce the threshold distance. For example, if buffer 1128 was not used, but rather footprint 1123 was "walked back" by the threshold distance, the control system might identify one of positions 1118 or 1120 as the first ordinal position, thus resulting in path 1101 not being sufficiently trimmed to avoid tines 1106 and 1108.

Figure 12:
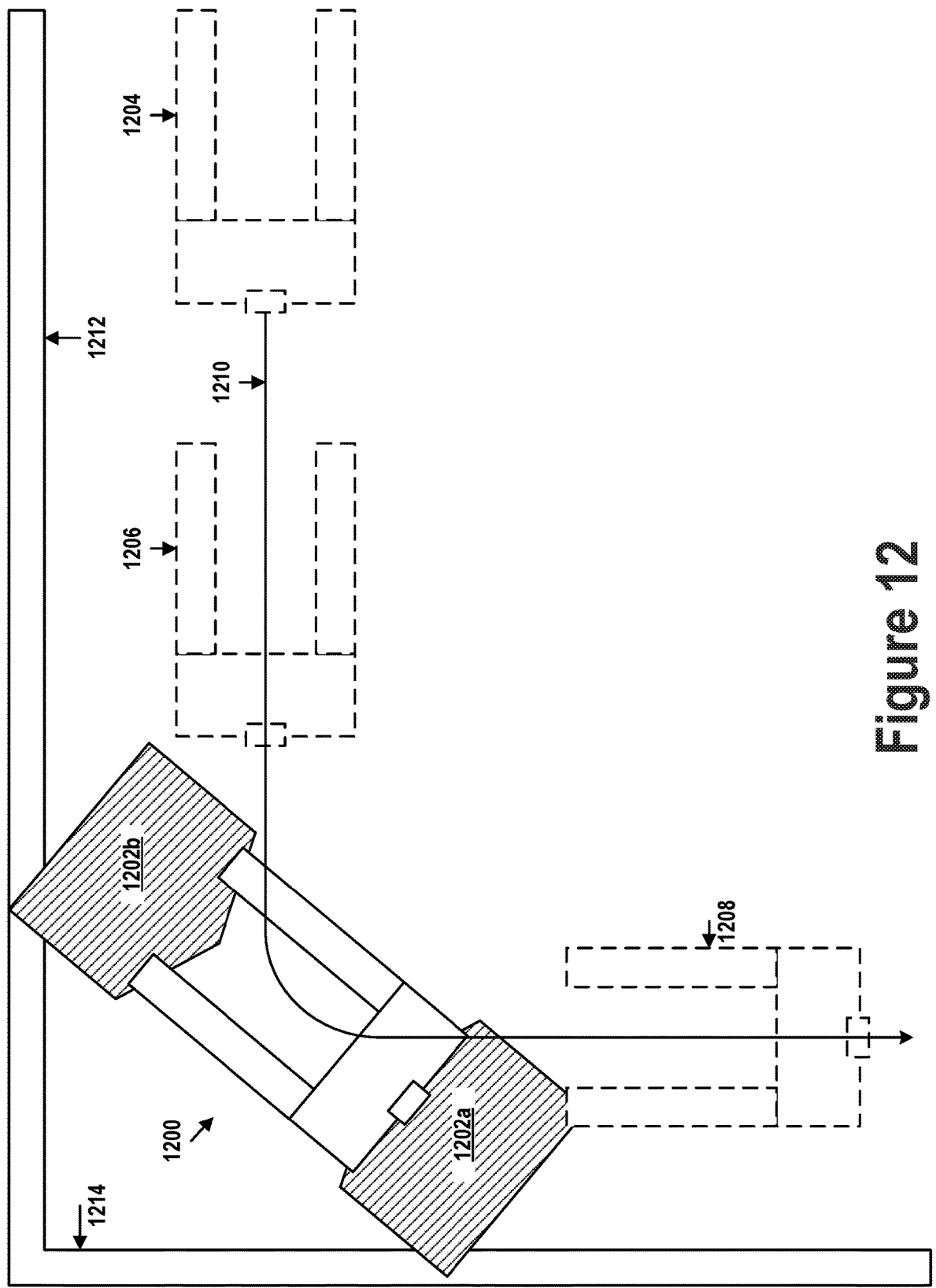
FIG. 12 illustrates obstacles in warning fields of a vehicle, in accordance with example embodiments.

FIG. 12 illustrates how the obstacle detection and avoidance operations herein described may allow for improved throughput in vehicle operation when compared with a vehicle safety system utilizing protective and warning fields, as shown in FIG. 9. FIG. 12 shows vehicle 1200 moving through an environment along path 1210. Vehicle 1200 utilize a safety system that includes front warning field 1202a and rear warning field 1202b, and which may also include protective fields, as shown in FIG. 9. The environment includes walls 1212 and 1214 defining a corner of the environment. Footprints 1204, 1206 and 1208 represent past and future positions of vehicle 1200 along path 1210.

While traveling along path 1210, vehicle 1200 will not collide with walls 1214 or 1212. However, warning fields 1202a and 1202b of vehicle 1200 will intersect with walls 1214 and 1212, respectively, when vehicle 1200 traverses the curved section of path 1210, as shown in FIG. 12. The safety system uses warning fields 1202a and 1202b to limit a speed of vehicle 1200 to under a threshold speed limit when an object is detected within warning field 1202a or 1202b. Thus, the safety system might limit the speed of vehicle 1200 to a speed below that with which vehicle 1200 might have originally been commanded to traverse the curved section of path 1210. Notably, the speed of vehicle 1200 might be limited even though vehicle 1200 is not expected to collide with any obstacles along path 1210. Such limiting of the speed of vehicle 1200 by the safety system may reduce the throughput of vehicle 1200, thus increasing the operating cost of a warehouse or other facility utilizing vehicles like vehicle 1200.

Accordingly, in some implementations, the control system may disable the warning fields 1202a and 1202b of vehicle 1200 to increase an average speed of vehicle 1200 along path 1210. The control system may instead carry out the operations described with respect to FIGS. 7-11C to detect and avoid obstacles without inadvertently limiting a speed of vehicle 1200. In some implementations, warning fields 1202a and 1202b may be disabled by the control system when target velocities of a velocity trajectory for vehicle 1200 to follow along path 1210 exceed the threshold speed limit set by the warning fields. Further, in some examples, the control system may determine the collision threshold distance or the speed threshold distance to place around obstacles based on a size of the area defined by the warning field or protective field. For example, the collision threshold distance or the speed threshold distance may be proportional to the warning or protective field area, or may be proportional to a length of the warning or protective field.

Notably, in some embodiments, the warning fields of the safety system might be determined internally by the safety system and might not be modifiable by the control system. Thus, the warning fields might not offer the same level of control and flexibility as the speed buffers placed around obstacles. On the other hand, the speed buffers may allow the control system to dynamically determine when to utilize the speed buffers as well as the size thereof.

In some embodiments, rather than disabling the safety system of vehicle 1200, the control system may work in cooperation with the safety system to detect the obstacles that would otherwise be undetected by the safety system (e.g., due to the safety system not using data from some of the available sensors). Further, in some instances, the control system may operate to determine paths that do not trigger the safety system of vehicle 1200, that is, paths that do not result in obstacles intersecting with warning fields 1202a and 1202b, for example (or any protective fields associated with vehicle 1200). Thus, the vehicle may operate with two redundant systems operating to avoid collisions with obstacles.

VII. Additional Example Operations

In some embodiments, for each respective position of the ordered sequence of positions along the trimmed path, a target velocity may be determined for the vehicle to cause the vehicle to stop at the end of the trimmed path. The vehicle may be caused to follow the trimmed path with the determined target velocities.

In some embodiments, the ordered sequence of positions may include a starting position and an ending position. Sequentially testing the ordered sequence of positions to identify the first ordinal position in the ordered sequence of positions may involve: determining, for a respective position of the ordered sequence of positions and beginning with the starting position, whether an area planned to be occupied by the vehicle at the respective position is within the threshold distance of the first object; when the area planned to be occupied by the vehicle at the respective position is not within the threshold distance of the first object, determining, for a subsequent respective position of the ordered sequence of positions, whether an area planned to be occupied by the vehicle at the subsequent respective position is within the threshold distance of the first object; and when the area planned to be occupied by the vehicle at the respective position is within the threshold distance of the first object, determining that the respective position is the first ordinal position.

In some embodiments, objects within the environment may be detected based on data from a sensor configured to detect objects along a first plane parallel to and situated a first distance above a ground surface of the environment.

In some embodiments, the path may start with a first section and end with a second section parallel, adjacent, and connected to the first section by a third section. Based on the data from the sensor, a map of the environment indicating the first object situated along the second section of the path may be determined. The first object may include a physical feature extending into an area planned to be occupied by the vehicle at a corresponding position along the first section of the path. The physical feature may be situated above or below the first plane and might not be indicated as an object in the map of the environment. The physical feature may be within the threshold distance of the first object. The second section, the third section, and a portion of the first section may be trimmed to avoid the physical feature of the first object.

In some embodiments, determining the intersection between the first object in the environment and the first area planned to be occupied by the vehicle while moving along the path may involve determining, for each respective position of the ordered sequence of positions along the path, a vehicle footprint indicating a region within a map of the environment to be occupied by the vehicle at the respective position. The map may indicate the first object within the environment. Determining the intersection between the first object in the environment and the first area planned to be occupied by the vehicle while moving along the path may also involve determining that a first vehicle footprint of the determined vehicle footprints intersects with the first object indicated by the map.

In some embodiments, each of the determined vehicle footprints may include a buffer region around the region within the map to be occupied by the vehicle at the respective position.

In some embodiments, a safety system of the vehicle may include a warning field defining an area around the vehicle. The safety system may be configured to cause the vehicle to travel under a threshold speed when an object is detected within the warning field. A velocity trajectory may be determined for the path. The velocity trajectory may define, for each respective position of the ordered sequence of positions along the path, a target velocity for the vehicle. A subset of the target velocities along the path may exceed the threshold speed of the warning field. The warning field of the safety system may be disabled to increase an average speed of the vehicle along the path. The threshold distance around the first object may be determined based on a size of the area defined by the warning field.

In some embodiments, the threshold distance may be a first threshold distance. It may be determined that a second area planned to be occupied by the vehicle while moving along the path is situated within a second threshold distance of a second object. The second object might not intersect with any areas planned to be occupied by the vehicle while moving along the path. In response to determining that the second area is situated within the second threshold distance of the second object, a speed limit may be determined for the vehicle at a position of the ordered sequence of positions corresponding to the second area.

In some embodiments, objects within the environment may be detected based on data from a sensor and indicated on a map. The map may include a two-dimensional representation of the environment. Based on the data from the sensor, a physical feature within the environment may be determined. The map may be determined by projecting a representation of the physical feature onto a plane defined by the two-dimensional representation of the environment.

In some embodiments, the path to be followed by the vehicle through the environment may include an executable path portion determined to be free of obstacles and a tentative path portion to be scanned for obstacles. The vehicle may be caused to follow the executable path portion. While the vehicle follows the executable path portion, a sensor connected to the vehicle may be caused to scan the tentative path portion and detect the first object situated along the tentative path portion. The tentative path portion may be trimmed to remove, from the ordered sequence of positions along the tentative path portion, (i) the first ordinal position and (ii) any positions subsequent thereto. Before the vehicle reaches the end of the trimmed path and in response to determining the intersection between the first object situated along the tentative path portion and the first area, an alternative tentative path may be determined for the vehicle to follow after the executable path portion to avoid the first object. The vehicle may be caused to follow the alternative tentative path.

In some embodiments, the path to be followed by the vehicle through the environment may include an executable path portion determined to be free of obstacles and a tentative path portion to be scanned for obstacles. The tentative path portion may follow the executable path portion. The vehicle may be caused to follow the executable path portion While the vehicle follows the executable path portion, a sensor connected to the vehicle may be caused to scan the tentative path portion and detect the first object situated along the tentative path portion. One or more areas planned to be occupied by the vehicle at positions of the ordered sequence along the executable path portion may be within the threshold distance of the first object. The tentative path portion and the executable path portion may be trimmed to remove, from the ordered sequence of positions along the tentative path portion and the executable path portion, (i) the first ordinal position along the executable path portion and (ii) any positions subsequent thereto. Before the vehicle reaches the end of the trimmed executable path portion and in response to determining the intersection between the first object situated along the tentative path portion and the first area, an alternative tentative path may be determined for the vehicle to follow after the trimmed executable path portion to avoid the first object. The vehicle may be caused to follow the alternative tentative path.

In some embodiments, determining the intersection between the first object and the first area may involve determining a plurality of objects that intersect with one or more areas planned to be occupied by the vehicle while moving along the path. An object, from the plurality of the objects, closest to a current position of the vehicle may be determined as the first object.

In some embodiments, a task to be performed by the vehicle in the environment may be determined. The threshold distance may be determined based on the determined task.

In some embodiments, the first object may be classified into a category of a plurality of predefined categories. The threshold distance may be determined based on the category into which the first object is classified.

In some embodiments, the path may lead to a target location. A region of available space in the environment traversable by the vehicle to reach the target location and avoid the first object may be determined. An alternative path for the vehicle to follow after the trimmed path may be determined. The alternative path may run through the region of available space, Motion of the vehicle along the alternative path may be synchronized with movements of other vehicles through the environment. The vehicle may be caused to follow the alternative path.

In some embodiments, the alternative path may be determined by selecting, from a roadmap graph, roadmap sections that lead to the target location. Similarly, the path to be followed through the vehicle through the environment may be defined by respective sections of the roadmap graph.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining, by a control system, a path to be followed by a robotic device through an environment, wherein the path comprises an ordered sequence of positions;
   determining, by the control system, a velocity trajectory for the path, wherein the velocity trajectory defines, for each respective position of the ordered sequence of positions along the path, a target velocity for the robotic device;
   identifying, by the control system, an object within the environment;
   applying, by the control system, a buffer region around the object, wherein the buffer region defines a threshold distance around the object;
   determining, by the control system, that a particular area planned to be occupied by the robotic device while moving along the path is situated within the buffer region and does not intersect with the object, wherein the particular area corresponds to a particular position of the ordered sequence of positions;
   in response to determining that the particular area is situated within the buffer region and does not intersect with the object, determining, by the control system, a speed limit for the robotic device at the particular position;
   adjusting the target velocity at the particular position to the speed limit; and
   causing the robotic device to follow the path according to the velocity trajectory as adjusted.

2. The method of claim 1, wherein a safety system of the robotic device comprises a warning field defining an area around the robotic device, wherein the safety system is configured to cause the robotic device to move under a threshold speed when an object is detected within the warning field, and wherein the method further comprises:
   disabling the warning field of the safety system; and
   determining the threshold distance around the object based on a size of the warning field.

3. The method of claim 1, wherein a safety system of the robotic device comprises a warning field defining an area around the robotic device, wherein the safety system is configured to cause the robotic device to move under a threshold speed when an object is detected within the warning field, and wherein the method further comprises:
disabling the warning field of the safety system; and
determining the speed limit based on the threshold speed.

4. The method of claim 1, wherein the object is a first object, wherein the buffer region is a first buffer region, wherein the particular area is a first area, wherein the particular position is a first position, and wherein the method further comprises:
identifying a second object within the environment;
applying a second buffer region around the object;
determining that a second area planned to be occupied by the robotic device while moving along the path is situated within the second buffer region and does not intersect with the second object, wherein the second area corresponds to a second position of the ordered sequence of positions;
in response to determining that the second area is situated within the second buffer region and does not intersect with the second object, modifying at least the second position within the path such that the second area is not situated within the second buffer region; and
causing the robotic device to follow the path as modified.

5. The method of claim 1, wherein the object is a first object, wherein the buffer region is a first buffer region, wherein the particular area is a first area, wherein the particular position is a first position, and wherein the method further comprises:
identifying a second object within the environment;
determining an intersection between the second object in the environment and a second area planned to be occupied by the robotic device while moving along the path, wherein the second area corresponds to a second position of the ordered sequence of positions;
in response to determining the intersection between the second object and the second area, sequentially testing the ordered sequence of positions to identify a first ordinal position in the ordered sequence of positions, wherein the first ordinal position corresponds to a third area planned to be occupied by the robotic device while moving along the path, wherein the third area is within a second threshold distance of the second object, and wherein all areas planned to be occupied by the robotic device at positions of the ordered sequence of positions preceding the first ordinal position are beyond the second threshold distance of the second object;
modifying at least one of (i) the second position, (ii) the first ordinal position, or (iii) one or more positions subsequent to the first ordinal position such that the second area does not intersect with the second object; and
causing the robotic device to follow the path as modified.

6. The method of claim 1, further comprising:
determining a task to be performed by the robotic device in the environment; and
determining at least one of (i) the threshold distance or (ii) the speed limit based on the determined task.

7. The method of claim 6, wherein determining the at least one of (i) the threshold distance or (ii) the speed limit based on the determined task comprises:
determining one or more physical properties of a load carried by the robotic device as part of the task; and
determining the at least one of (i) the threshold distance or (ii) the speed limit based on the one or more physical properties of the load.

8. The method of claim 1, further comprising:
classifying the object into a category of a plurality of predefined categories; and
determining at least one of (i) the threshold distance or (ii) the speed limit based on the category into which the object is classified.

9. The method of claim 1, further comprising:
determining at least one of (i) the threshold distance or (ii) the speed limit based on physical properties of the robotic device.

10. The method of claim 1, wherein the ordered sequence of positions comprises a starting position and an ending position, and wherein determining that the particular area is situated within the buffer region and does not intersect with the object comprises:
determining, for a respective position of the ordered sequence of positions and beginning with the starting position, whether an area planned to be occupied by the robotic device at the respective position is situated within the buffer region;
when the area planned to be occupied by the robotic device at the respective position is not situated within the buffer region, determining, for a subsequent respective position of the ordered sequence of positions, whether an area planned to be occupied by the robotic device at the subsequent respective position is situated within the buffer region; and
when the area planned to be occupied by the robotic device at the respective position is situated within the buffer region, determining that the respective position is the particular position.

11. The method of claim 1, wherein the control system is configured to identify the object within the environment by:
receiving, from a sensor configured to detect objects along a first plane parallel to and situated a first distance above a ground surface of the environment, sensor data representing the object; and
identifying the object based the sensor data.

12. The method of claim 1, wherein determining that the particular area is situated within the buffer region and does not intersect with the object comprises:
determining, for each respective position of the ordered sequence of positions along the path, a robot footprint indicating a region within a map of the environment to be occupied by the robotic device at the respective position, wherein the map indicates the object within the environment and the buffer region therearound; and
determining that a first robot footprint of the determined robot footprints intersects with the buffer region and does not intersect with the object indicated by the map.

13. The method of claim 1, wherein identifying the object within the environment comprises:
detecting, based on sensor data from a sensor, a physical feature within the environment, wherein the sensor data represents the physical feature in three dimensions; and
determining a map by projecting the sensor data onto a two-dimensional representation of the environment.

14. A system comprising:
a robotic device; and
a control system configured to perform operations comprising:
determining a path to be followed by the robotic device through an environment, wherein the path comprises an ordered sequence of positions;

determining a velocity trajectory for the path, wherein the velocity trajectory defines, for each respective position of the ordered sequence of positions along the path, a target velocity for the robotic device;

identifying an object within the environment;

applying a buffer region around the object, wherein the buffer region defines a threshold distance around the object;

determining that a particular area planned to be occupied by the robotic device while moving along the path is situated within the buffer region and does not intersect with the object, wherein the particular area corresponds to a particular position of the ordered sequence of positions;

in response to determining that the particular area is situated within the buffer region and does not intersect with the object, determining a speed limit for the robotic device at the particular position; and adjusting the target velocity at the particular position to the speed limit.

15. The system of claim 14, wherein a safety system of the robotic device comprises a warning field defining an area around the robotic device, wherein the safety system is configured to cause the robotic device to move under a threshold speed when an object is detected within the warning field, and wherein the operations further comprise:

disabling the warning field of the safety system; and determining the threshold distance around the object based on a size of the warning field.

16. The system of claim 14, wherein a safety system of the robotic device comprises a warning field defining an area around the robotic device, wherein the safety system is configured to cause the robotic device to move under a threshold speed when an object is detected within the warning field, and wherein the operations further comprise:

disabling the warning field of the safety system; and determining the speed limit based on the threshold speed.

17. The system of claim 14, wherein the object is a first object, wherein the buffer region is a first buffer region, wherein the particular area is a first area, wherein the particular position is a first position, and wherein the operations further comprise:

identifying a second object within the environment;

applying a second buffer region around the object;

determining that a second area planned to be occupied by the robotic device while moving along the path is situated within the second buffer region and does not intersect with the second object, wherein the second area corresponds to a second position of the ordered sequence of positions;

in response to determining that the second area is situated within the second buffer region and does not intersect with the second object, modifying at least the second position within the path such that the second area is not situated within the second buffer region; and causing the robotic device to follow the path as modified.

18. The system of claim 14, wherein the operations further comprise:

determining a task to be performed by the robotic device in the environment; and determining at least one of (i) the threshold distance or (ii) the speed limit based on the determined task.

19. The system of claim 14, wherein the operations further comprise:

classifying the object into a category of a plurality of predefined categories; and determining at least one of (i) the threshold distance or (ii) the speed limit based on the category into which the object is classified.

20. A non-transitory computer readable storage medium having stored thereon instructions that, when executed by a computing device, cause the computing device to perform operations comprising:

determining a path to be followed by a robotic device through an environment, wherein the path comprises an ordered sequence of positions;

determining a velocity trajectory for the path, wherein the velocity trajectory defines, for each respective position of the ordered sequence of positions along the path, a target velocity for the robotic device;

identifying an object within the environment;

applying a buffer region around the object, wherein the buffer region defines a threshold distance around the object;

determining that a particular area planned to be occupied by the robotic device while moving along the path is situated within the buffer region and does not intersect with the object, wherein the particular area corresponds to a particular position of the ordered sequence of positions;

in response to determining that the particular area is situated within the buffer region and does not intersect with the object, determining a speed limit for the robotic device at the particular position; and adjusting the target velocity at the particular position to the speed limit.

* * * * *